(12) United States Patent
Braun

(10) Patent No.: US 7,530,113 B2
(45) Date of Patent: May 5, 2009

(54) SECURITY SYSTEM AND METHOD FOR AN INDUSTRIAL AUTOMATION SYSTEM

(75) Inventor: Scott D. Braun, Fredonia, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 712 days.

(21) Appl. No.: 10/902,453

(22) Filed: Jul. 29, 2004

(65) Prior Publication Data

US 2006/0026672 A1 Feb. 2, 2006

(51) Int. Cl.
*G06F 7/04* (2006.01)
*H04L 9/32* (2006.01)
*G06F 17/30* (2006.01)
*G06F 15/173* (2006.01)

(52) U.S. Cl. .............. 726/28; 726/4; 726/17; 713/168; 713/172; 713/183; 713/184; 713/185; 713/186; 709/224; 709/225; 700/9; 700/237; 700/83

(58) Field of Classification Search .............. 726/28, 726/4, 17; 713/168, 172, 183–186; 709/224–225; 700/9, 237, 83
See application file for complete search history.

(56) References Cited

U.S. PATENT DOCUMENTS

| | | | |
|---|---|---|---|
| 6,636,620 | B1 | 10/2003 | Hoshino |
| 2003/0030542 | A1 | 2/2003 | Von Hoffmann |
| 2003/0140094 | A1 | 7/2003 | Collier et al. |
| 2003/0141959 | A1* | 7/2003 | Keogh et al. ............... 340/5.53 |
| 2003/0200008 | A1* | 10/2003 | Wilson ....................... 700/236 |
| 2003/0231100 | A1 | 12/2003 | Chung |
| 2004/0044420 | A1 | 3/2004 | Dinges et al. |
| 2004/0162996 | A1* | 8/2004 | Wallace et al. .............. 713/201 |
| 2004/0236954 | A1 | 11/2004 | Vogt et al. |
| 2004/0259111 | A1* | 12/2004 | Marlowe et al. ............... 435/6 |
| 2004/0260518 | A1* | 12/2004 | Polz et al. .................... 702/188 |
| 2004/0260954 | A1* | 12/2004 | Morse ......................... 713/202 |
| 2005/0021158 | A1* | 1/2005 | De Meyer et al. ............. 700/23 |
| 2005/0021839 | A1* | 1/2005 | Russell et al. ............... 709/238 |

(Continued)

FOREIGN PATENT DOCUMENTS

CN 1221160 A 6/1999

(Continued)

OTHER PUBLICATIONS

Zecevic, Goran. "Web based interface to SCADA system", International Conference on Power System Technology, Aug. 1998.*
Allen-Bradley User Manual entitled "1336 Impact™ Adjustable Frequency AC Drive; 0.37-597 kW (0.5-800 HP) Version 1.xx-4.xx"; (date unknown); 50-page (as photocopied) brochure; Product of Rockwell Automation.
Allen-Bradley User Manual entitled "SoftLogix 5 Controller; 1789-SL5, 1789-SL51, 1789-SL52"; (Apr. 2001); 68-page (as photocopied) brochure; Publication 1789-UM001B-EN-P; Product of Rockwell Automation.

(Continued)

*Primary Examiner*—Michael J Simitoski
(74) *Attorney, Agent, or Firm*—Fletcher Yoder Law; Alexander R. Kuszewski

(57) ABSTRACT

An industrial automation system comprises a security access device, an industrial automation device, a user interface, and a security interface. The user interface is configured to provide a user with access to data stored inside the industrial automation device. The security interface is configured to receive information from the access device and, based on the information received from the access device, to provide authorization for the user to access the data stored inside the industrial automation device using the user interface.

81 Claims, 8 Drawing Sheets

U.S. PATENT DOCUMENTS

| | | | |
|---|---|---|---|
| 2005/0155043 A1* | 7/2005 | Schulz et al. | 719/328 |
| 2005/0229004 A1* | 10/2005 | Callaghan | 713/185 |
| 2006/0143469 A1 | 6/2006 | Schmidt et al. | |

FOREIGN PATENT DOCUMENTS

| | | |
|---|---|---|
| CN | 1387159 A | 12/2002 |
| CN | 1443343 A | 9/2003 |
| CN | 1465496 A | 1/2004 |
| CN | 1485746 A | 3/2004 |
| EP | 1306816 A2 | 5/2003 |

OTHER PUBLICATIONS

U.S. Department of Homeland Security "Information Analysis and Infrastructure Protection"; 2-page document; [obtained from http://www.ciao.gov/industry/index.html]; [page last updated: Feb. 3, 2004].

Allen-Bradley "Getting Results Manual" (DriveExplorer™, Version 2.02); (Mar. 2001); 34-page (as photocopied) brochure; Publication 9306-GR001B-EN-E; © 2000 Allen-Bradley Company, Inc.; Product of Rockwell Automation.

"Jump Onboard C-Manufacturing"; 4-page document; [obtained from http://www.ab.com/abjournal/april2002/features/jump_onboard/index.html]; [page last updated: Jan. 29, 2004]; A-B Journal Online: Apr. 2002.

"Rockwell Software Products with Factory Talk Components" and "Web-Based Manufacturing Portals"; 2-page document (published prior to filing date).

Rockwell Software User's Guide entitled "RSView Supervisory Edition™"; (Dec. 2003); 152-page (as photocopied) brochure; Doc ID VIEWSE-UM003C-EN-E; © 2003 Rockwell Software Inc.; Product of Rockwell Automation.

Stackhouse et al.; "Siemens Security and Safety White Paper" (Apr. 2003); 21-page document.

"PLC-5® A.I. Series™ Software Reference"; (Jun. 1997); 41 pages; Product of Rockwell Software.

"Integrated Architecture"; (Oct. 2003); 42-page (as photocopied) brochure; Publication IA-BR002B-EN-P; © 2003 Rockwell Automation Inc.; Product of Rockwell Automation.

Allen-Bradley User Manual entitled "DriveLogix Controller"; (Oct. 2002); 172-page (as photocopied) brochure; Publication 20D-UM002A-EN-P; © 2002 Rockwell International Corporation; Product of Rockwell Automation.

"The New Buzz . . . Factory Talk"; 8-page document; [obtained from http://www.ab.com/abjournal/april2002/cover/index.html]; [page last updated: Jan. 29, 2004]; A-B Journal Online: Apr. 2002.

Allen-Bradley brochure entitled "For an Integrated Architecture, Take Control with Logix"; (May 2003); 36-page (as photocopied) brochure; Publication LOGIX-BR001D-EN-P; © 2002 Rockwell Automation; Product of Rockwell Automation.

Rockwell Software User's Guide entitled "RSView Machine Edition™"; (Dec. 2003); 114-page (as photocopied) brochure; Doc ID VIEWME-UM003C-EN-E; © 2003 Rockwell Software Inc.; Product of Rockwell Automation.

Siemens "Information Security in Industrial Communications" White Paper; (Nov. 2003); 17-page document; © Siemens AG 2003.

"Establish Trust to Protect and Grow Your Online Business (*Authentication and Encryption—The Cornerstones of Online Security*)"; 12-page document; [obtained from http://www.verisign.com/resources/gd/authentication/authentication.html]; [page last updated: Jun. 8, 2004]; © 2002 VeriSign, Inc.

"Best-In-Class Functionality" (DriveExecutive™ Software); (Aug. 2001); 2-page document; Publication 9303-PP002A-EN-P; © 2001 Rockwell Automation, Product of Rockwell Automation.

"Best-In-Class Software Offers Simplified Programming for Drives" (DriveTools™ SP Software v3.01); (Jan. 2004); 4-page document; Publication 9303-PP002D-EN-P; © 2004 Rockwell Automation; Product of Rockwell Automation.

"Information—Where and When You Need It"; *The View*, vol. 4, Issue 1; (Nov. 2003); 55-page (as photocopied) brochure; Publication VIEW-BR004B-EN-P; © 2003 Rockwell Automation, Inc.; Product of Rockwell Automation.

"The Clinton Administration's Policy on Critical Infrastructure Protection: Presidential Decision Directive 63"; White Paper; (May 22, 1998); 15-page document.

"Securing Your Automation Ethernet Network"; (Jul. 6, 2001); 14-page document; Automation Business Network Certification Services; Schneider Automation Inc.; © 2001 Schneider Automation Eclipse Services.

"Rockwell Software Products"; 1-page document; [obtained from http://www.software.rockwell.com/navigation/products/index.cfm?print=1]; [page last updated: Jun. 10, 2004]; © 2004 Rockwell Automation.

"RSAutomation Desktop (*An integrated control system design environment*)"; 2-page document; [obtained from http://www.software.rockwell.com/rsautomationdesktop/?print=1]; [page last updated: Jun. 10, 2004]; © 2004 Rockwell Automation.

"RSLogix (*Programming for Allen-Bradley PLC-5, SLC 500, MicroLogix, and Logix5000 families*)"; 2-page document; [obtained from http://www.software.rockwell.com/rslogix/?print=1]; [page last updated: Jun. 10, 2004]; © 2004 Rockwell Automation.

"RSLogix Emulate (*Debugging Your Logic Has Never Been Easier*)"; 1-page document; [obtained from http://www.software.rockwell.com/rslogixemulate/?print=1]; [page last updated: Jun. 10, 2004]; © 2004 Rockwell Automation.

"RSNetWorx (*A Powerful Configuration and Diagnostics Tool for ControlNet, DeviceNet, and EtherNet/IP Users*)"; 2-page document; [obtained from http://www.software.rockwell.com/rsnetworx/?print=1]; [page last updated: Jun. 10, 2004]; © 2004 Rockwell Automation.

"RSTestStand (*Test Your Control System Off-line—Out of the Critical Path of Start-up*)"; 2-page document; [obtained from http://www.software.rockwell.com/rsteststand/?print=1]; [page last updated: Jun. 10, 2004]; © 2004 Rockwell Automation.

"RSTestStand Enterprise (*Interactively Design and Test Your Control System*)"; 1-page document; [obtained from http://www.software.rockwell.com/rsteststandenterprise/?print=1]; [page last updated: Jun. 10, 2004]; © 2004 Rockwell Automation.

"RSView Studio (*Development Environment for RSView Enterprise Series*)"; 1-page document; [obtained from http://www.software.rockwell.com/rsviewstudio/?print=1]; [page last updated: Jun. 10, 2004]; © 2004 Rockwell Automation.

"Arena (*Forward Visibility for Your Business*™)"; 2-page document; [obtained from http://www.software.rockwell.com/arenasimulation/?print=1]; [page last updated: Jun. 10, 2004]; © 2004 Rockwell Automation.

"RSView Enterprise Series (*RSView Machine & Supervisory Editions*)"; 2-page document; [obtained from http://www.software.rockwell.com/rsviewenterpriseseries/?print=1]; [page last updated: Jun. 10, 2004]; © 2004 Rockwell Automation.

"RSView Machine Edition (*Machine-Level HMI for Open and Embedded Solutions*)"; 2-page document; [obtained from http://www.software.rockwell.com/rsviewme/?print=1]; [page last updated: Jun. 10, 2004]; © 2004 Rockwell Automation.

"RSView Supervisory Edition (*Distributed HMI for Enterprise Solutions*)"; 3-page document; [obtained from http://www.software.rockwell.com/rsviewse/?print=1]; [page last updated: Jun. 10, 2004]; © 2004 Rockwell Automation.

"RSView32 (*The Clearest View of your Enterprise*)"; 2-page document; [obtained from http://www.software.rockwell.com/rsview32/?print=1]; [page last updated Jun. 10, 2004]; © 2004 Rockwell Automation.

"RSView32 Add-ons (*Extend RSView32 Core Features with Add-on Architecture*)"; 2-page document; [obtained from http://www.software.rockwell.com/rsview32addons/?print=1]; [page last updated: Jun. 10, 2004]; © 2004 Rockwell Automation.

"RSLadder (*ActiveX™ Control*)"; 1-page document; [obtained from http://www.software.rockwell.com/rsladder/?print=1]; [page last updated: Jun. 10, 2004]; © 2004 Rockwell Automation.

"RSView32 Messenger (*Expand Your View with Alarm Messaging*)"; 1-page document; [obtained from http://www.software.rockwell.com/rsview32-messenger/?print=1]; [page last updated: Jun. 10, 2004]; © 2004 Rockwell Automation.

"RSView32 RecipePro (*Expand Your View with Recipe Management*)"; 1-page document; [obtained from http://www.software.rockwell.com/rsview32-recipepro/?print=1]; [page last updated: Jun. 10, 2004]; © 2004 Rockwell Automation.

"RSView32 SPC (*Expanding the World of HMI with Statistical Process Control*)"; 1-page document; [obtained from http://www.software.rockwell.com/rsview32-spc/?print=1]; [page last updated: Jun. 10, 2004]; © 2004 Rockwell Automation.

"RSView32 TrendX (*Expanding Your View with Enhanced Trending*)"; 1-page document; [obtained from http://www.software.rockwell.com/rsview32-trendx/?print=1]; [page last updated: Jun. 10, 2004]; © 2004 Rockwell Automation.

"RSView32 Active Display System (*Expand Your View Across Your Networks and Beyond*)"; 1-page document; [obtained from http://www.software.rockwell.com/rsview32ads/?print=1]; [page last updated: Jun. 10, 2004]; © 2004 Rockwell Automation.

"RSView32 GEMTool (*Manage SECS-II Messaging*)"; 1-page document; [obtained from http://www.software.rockwell.com/rsview32gemtool/?print=1]; [page last updated: Jun. 10, 2004]; © 2004 Rockwell Automation.

"RSView32 SECSHost (*Communicate with Semiconductor Manufacturing Equipment*)"; 1-page document; [obtained from http://www.software.rockwell.com/rsview32secshost/?print=1]; [page last updated: Jun. 10, 2004]; © 2004 Rockwell Automation.

"RSView32 WebServer (*Expand Your View Across the Web*)"; 1-page document; [obtained from http://www.software.rockwell.com/rsview32webserver/?print=1]; [page last updated: Jun. 10, 2004]; © 2004 Rockwell Automation.

"RSBizWare Batch (*Complete Process Management Solution for Batch Manufacturing*)"; 3-page document; [obtained from http://www.software.rockwell.com/rsbizwarebatch/?print=1]; [page last updated: Jun. 10, 2004]; © 2004 Rockwell Automation.

"RSBizWare BatchCampaign (*Batch Production Optimization*)"; 1-page document; [obtained from http://www.software.rockwell.com/rsbizwarebatchcampaign/?print=1]; [page last updated: Jun. 10, 2004]; © 2004 Rockwell Automation.

RSBizWare BatchERP (*Enterprise Integration for Batch Manufacturing*); 1-page document; [obtained from http://www.software.rockwell.com/rsbizwarebatcherp/?print=1]; [page last updated: Jun. 10, 2004]; © 2004 Rockwell Automation.

"RSBizWare eProcedure"; 1-page document; [obtained from http://www.software.rockwell.com/rsbizwareeprocedure/?print=1]; [page last updated: Jun. 10, 2004]; © 2004 Rockwell Automation.

"RSBizWare MaterialTrack"; 1-page document; [obtained from http://www.software.rockwell.com/rsbizwarematerialtrack/?print=1]; [page last updated: Jun. 10, 2004]; © 2004 Rockwell Automation.

"RSBizWare Historian (*Turn Production Data into Actionable Information*)"; 1-page document; [obtained from http://www.software.rockwell.com/rsbizwarehistorian/?print=1]; [page last updated: Jun. 10, 2004]; © 2004 Rockwell Automation.

"RSBizWare PlantMetrics (*Exploit Plant floor Data to Maximize Operational Equipment Efficiency*)"; 1-page document; [obtained from http://www.software.rockwell.com/rsbizwareplantmetrics/?print=1]; [page last updated: Jun. 10, 2004]; © 2004 Rockwell Automation.

"RSBizWare Scheduler (*Add Value to Production Scheduling*)"; 1-page document; [obtained from http://www.software.rockwell.com/rsbizwarescheduler/?print=1]; [page last updated: Jun. 10, 2004]; © 2004 Rockwell Automation.

"RSEnergyMetrix (*Scaleable Web-based Energy Management*)"; 1-page document; [obtained from http://www.software.rockwell.com/rsenergymetrix/?print=1]; [page last updated: Jun. 10, 2004]; © 2004 Rockwell Automation.

"RSLinx Family of Products (*An Industrial Communication Hub*)"; 2-page document; [obtained from http://www.software.rockwell.com/rslinx/?print=1]; [page last updated: Jun. 10, 2004]; © 2004 Rockwell Automation.

"RSLoop Optimizer (*Advanced Optimization Analysis*)"; 3-page document; [obtained from http://www.software.rockwell.com/rsloopoptimizer/?print=1]; [page last updated: Jun. 10, 2004]; © 2004 Rockwell Automation.

"RSPower32 (*The Multi-Purpose Power and Energy Management Tool*)"; 1-page document; [obtained from http://www.software.rockwell.com/rspower32/?print=1]; [page last updated: Jun. 10, 2004]; © 2004 Rockwell Automation.

"RSSq1 (*Get Data. Get Control.*)"; 1-page document; [obtained from http://www.software.rockwell.com/rssq1/?print=1]; [page last updated: Jun. 10, 2004]; © 2004 Rockwell Automation.

"RSSq1 Gateway for SAP (*Get Data. Get Control.*)"; 1-page document; [obtained from http://www.software.rockwell.com/rssq1gateway/?print=1]; [page last updated: Jun. 10, 2004]; © 2004 Rockwell Automation.

"RSTune (*PID Loop Tuner*)"; 1-page document; [obtained from http://www.software.rockwell.com/rstune/?print=1]; [page last updated: Jun. 10, 2004]; © 2004 Rockwell Automation.

"Interchange"; 1-page document; [obtained from http://www.software.rockwell.com/interchange/?print=1]; [page last updated: Jun. 10, 2004]; © 2004 Rockwell Automation.

"ViewAnyWare (*A Common Visualization Strategy Across the Enterprise*)"; 2-page document; [obtained from http://www.software.rockwell.com/viewanyware/?print=1]; [page last updated: Jun. 10, 2004]; © 2004 Rockwell Automation.

"RSMACC (*Maintenance Automation Control Center*)"; 1-page document; [obtained from http://www.software.rockwell.com/rsmacc/?print=1]; [page last updated: Jun. 10, 2004]; © 2004 Rockwell Automation.

"RSNetWorx MD (*Diagnostic Monitoring*)"; 1-page document; [obtained from http://www.software.rockwell.com/rsnetworxmd/?print=1]; [page last updated: Jun. 10, 2004]; © 2004 Rockwell Automation.

"Entek (*The Complete Asset Management Solution for Operations and Maintenance*)"; 3-page document; [obtained from http://www.software.rockwell.com/entek/?print=1]; [page last updated: Jun. 10, 2004]; © 2004 Rockwell Automation.

"Emonitor Process (*Process Data Analysis Software System*)"; 1-page document; [obtained from http://www.software.rockwell.com/emonitorprocess/?print=1]; [page last updated: Jun. 10, 2004]; © 2004 Rockwell Automation.

"Emonitor Enlube PM (*Machinery Oil Analysis Information Software System*)"; 1-page document; [obtained from http://www.software.rockwell.com/emonitorenlubepm/?print=1]; [page last updated: Jun. 10, 2004]; © 2004 Rockwell Automation.

"Emonitor Odyssey (*Complete Integrated Condition Monitoring Software System*)"; 1-page document; [obtained from http://www.software.rockwell.com/emonitorodyssey/?print=1]; [page last updated: Jun. 10, 2004]; © 2004 Rockwell Automation.

"Emonitor Enshare (*Plant Asset Management Software System*)"; 1-page document; [obtained from http://www.software.rockwell.com/emonitorenshare/?print=1]; [page last updated: Jun. 10, 2004]; © 2004 Rockwell Automation.

"Emonitor MAXIMO Gateway (*Integration to Rockwell Automation's Comprehensive Solution for Enterprise Asset Health Information*)"; 1-page document; [obtained from http://www.software.rockwell.com/emonitormaximogateway/?print=1]; [page last updated: Jun. 10, 2004]; © 2004 Rockwell Automation.

"Plantlink (*Graphical Machinery Annunciation software*)"; 1-page document; [obtained from http://www.software.rockwell.com/emonitorplantlink/?print=1]; [page last updated: Jun. 10, 2004]; © 2004 Rockwell Automation.

"Eshape (*Operating Deflection Shape Software*)"; 1-page document; [obtained from http://www.software.rockwell.com/emonitoreshape/?print=1]; [page last updated: Jun. 10, 2004]; © 2004 Rockwell Automation.

"Entrx (*High Speed Transient Data Analysis System*)"; 1-page document; [obtained from http://www.software.rockwell.com/entrx/?print=1]; [page last updated: Jun. 10, 2004]; © 2004 Rockwell Automation.

"Enline 66 (*Data and Alarm Status Display from Entek 6600 Protection Monitors*)" 1-page document; [obtained from http://www.software.rockwell.com/emonitorenline66/?print=1]; [page last updated: Jun. 10, 2004]; © 2004 Rockwell Automation.

"Lubelink (*Oil Analysis Bench Kit Software*)"; 1-page document; [obtained from http://www.software.rockwell.com/lubelink/?print=1]; [page last updated: Jun. 10, 2004]; © 2004 Rockwell Automation.

\* cited by examiner

SECURITY SYSTEM AND METHOD FOR AN INDUSTRIAL AUTOMATION SYSTEM

BACKGROUND

The present invention relates to security systems and methods for industrial automation systems.

Industrial automation systems are known for automating industrial processes. For example, industrial automation systems have been used for material handling, robotics, airport baggage handling, water and wastewater treatment, cement production, semiconductor fabrication, electric power, entertainment, food processing, mining, beverage and packaging operations, ski lift operations, forest products processing, life sciences, logistic processes, fibers and textiles processing, metal forming, automotive, petroleum and chemical processing, plastics processing, automated transportation, health care, agriculture, postal and shipping, and other manufacturing processes, to name but a few examples.

There exists an ongoing need to provide security for industrial automation systems. Security is desirable in order to limit access that may obtained to the automation system, for example, for purposes of obtaining information from the system, for purposes of making changes to the system, and so on. For example, responsibility for operating/maintaining certain aspects of an industrial automation system may be given only to certain qualified individuals. It is typically desirable to prevent other individuals from gaining access to the system to make changes since those individuals may not be qualified to make such changes. Further, it is typically desirable to limit the ability of unauthorized individuals to gain access to the system even just for purposes of checking system settings or otherwise obtaining information about system operation. For example, if a particular manufacturing process is held as a trade secret, it may be desirable to closely guard read access to the automation system so that an unauthorized individual cannot obtain detailed information about the manufacturing process. Likewise, it may also be desirable to limit access to other types of manufacturing information, such as production quantities, defect rates, and so on. Further, it may be desirable to prevent ill-intentioned individuals, such as computer hackers or terrorists, from gaining access to the industrial automation system for purposes of causing damage to the automation system, to the items it processes or manufacturers, or to related infrastructure.

At the site of an industrial automation system, it may be possible to gain access to the industrial automation system by using a user interface associated with one or more of the automation devices that forms the industrial automation system. For example, an individual may use a user interface associated with a motor drive to gain access to the motor drive. Alternatively, standard interfaces are sometimes provided that allow access to be gained by connecting a laptop or other computer to a communication network that connects portions of the industrial automation system.

Further, it is becoming more and more common to connect industrial automation devices to the Internet, and the same types of threats that are posed on-site can also be posed from remote locations via the Internet. For example, industrial automation devices such as motor drives, multiplexed input/output devices, automation controllers, and others have been provided with ports for an Ethernet connection. Such an Ethernet connection may be used to connect the device to the Internet, for example, directly or via a local area network. Connecting an industrial automation device directly to the Internet may be desirable, for example, to allow firmware to be downloaded to the industrial automation device from the manufacturer. Alternatively, an industrial automation device may be connected via an Ethernet connection to a local area network or other company-wide business/management information systems (e.g., a company-wide intranet) in order to provide management with real-time access to plant floor data. However, since such intranets are also commonly connected to the Internet, the industrial automation devices become indirectly connected to the Internet. Once an industrial automation device is connected to the Internet, either directly or indirectly, it becomes vulnerable to threats.

A need therefore exists for systems and methods which provide security for industrial automation devices. Although certain advantages are described herein, it should be understood that the disclosed systems/methods may also be used to achieve different and/or additional advantages, without necessarily achieving any of the advantages described herein.

SUMMARY

According to a first preferred embodiment, an industrial automation system comprises a security access device, an industrial automation device, a user interface, and a security interface. The user interface is configured to provide a user with access to data stored inside the industrial automation device. The security interface is configured to receive information from the access device and, based on the information received from the access device, to provide authorization for the user to access the data stored inside the industrial automation device using the user interface.

According to a second preferred embodiment, an industrial automation device comprises a data storage area and a security interface. The data storage area has configuration and operational information stored therein. The security interface is coupled (directly or indirectly) to the data storage area. The security interface is configured to authenticate a user and to permit the user to access the data storage area based on identification information received from a security access device.

According to a third preferred embodiment, an industrial automation system comprises a user interface, a security access device, a plurality of security interfaces, a communication network, a plurality of motor drives, and a plurality of automation controllers. The plurality of motor drives are coupled to each other by way of the communication network. Each respective motor drive has associated therewith a respective one of the plurality of security interfaces. The respective security interface is configured to receive information from the access device and, based on the information received from the access device, to provide authorization for the user to access the data stored inside the respective motor drive using the user interface. Likewise, the plurality of automation controllers are coupled to each other and to the plurality of motor drives by way of the communication network. Each respective automation controller has associated therewith a respective one of the plurality of security interfaces. The respective security interface for each automation controller is configured to receive information from the access device and, based on the information received from the access device, to provide authorization for the user to access the data stored inside the respective automation controller using the user interface.

According to a fourth preferred embodiment, an industrial automation system comprises a communication network, a security access device, a security interface, a user interface, a plurality of motor drives, a plurality of automation controllers, and a security module. The security interface is configured to receive information from the security access device.

The user interface is coupled to the security interface and to the communication network. The plurality of motor drives are coupled to each other by way of the communication network. The plurality of automation controllers coupled to each other and to the plurality of motor drives by way of the communication network. The security module is configured to provide the user with access, via the user interface, to data stored in the plurality of motor drives and to data stored in the plurality of automation controllers based on an authentication of the user using the security access device.

It should be understood that the detailed description and specific examples, while indicating preferred embodiments of the present invention, are given by way of illustration and not limitation. Many modifications and changes within the scope of the present invention may be made without departing from the spirit thereof, and the invention includes all such modifications.

DETAILED DESCRIPTION OF THE EMBODIMENTS

Figure 1:
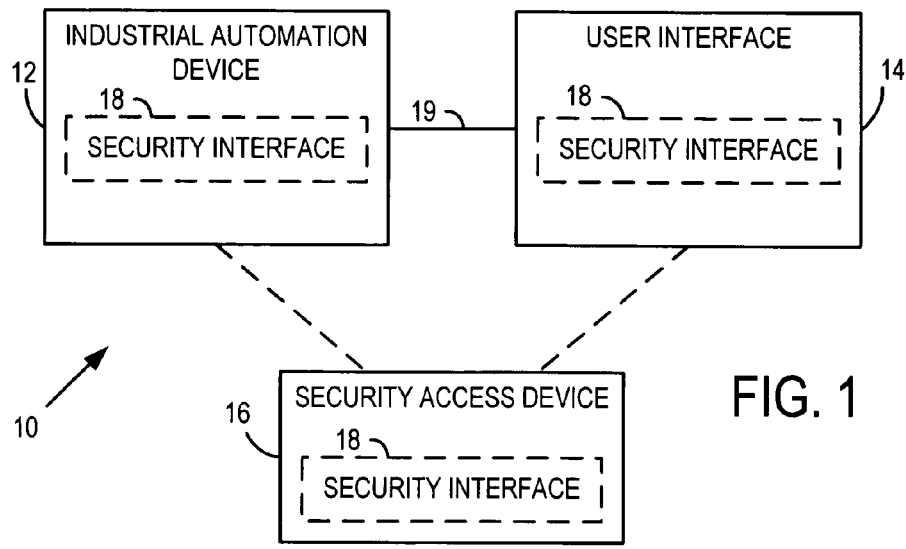
FIG. 1 is an industrial automation system which includes an automation device and a security access device.

Referring now to FIG. 1, an example of an industrial automation system 10 according to a preferred embodiment is illustrated. The industrial automation system 10 comprises an industrial automation device 12, a user interface 14, an electronic security access device 16, and a security interface 18.

The industrial automation device 12 is used to control at least a portion of an industrial process (not shown). The automation device 12 may, for example, be a motor drive, an automation controller (e.g., programmable controller system), or other device. The automation device 12 may also be a sensor or an actuator, for example, in a network configuration. Although a separate network connection for the industrial automation device 12 is not shown in FIG. 1, it will be appreciated that the arrangement of FIG. 1 may be provided in a stand-alone or in a network configuration.

The automation device 12 is accessible to a user by way of the user interface 14. Although the user interface 14 is shown as being separate from the automation device 12, it will be appreciated that the user interface 14 may also be integrated with the automation device 12.

The user interface 14 is configured to provide a user with access to data stored inside the industrial automation device 12. For example, the user interface 14 may cooperate with the automation device 12 to provide the user with read access to information for the automation device 12, to provide the user with read/write access to information for the automation device 12, and so on. The data to which the user is provided access may include, for example, configuration information (e.g., device settings), I/O status information, data tables, program logic, diagnostics/alarms/events information, and so on. The user interface 14 may be connected directly or indirectly to the automation device 12, e.g., by way of a link 19, which may be a point-to-point link, a network link, or other link, depending at least in part on whether the user interface 14 is integrated with or separate from the automation device 12. Although generally herein the reference number 12 is used to refer to automation devices and the reference number 14 is used to refer to user interfaces, it will be appreciated that in some instances a given piece of hardware may operate as both. For example, a human-machine interface that is also programmed with control logic is both a user interface and an automation device.

The access device 16 is configured to provide the security interface 18 with information that may be used to authenticate a user that is attempting to obtain access to the automation device 12. In one embodiment, the access device 16 is hand-held and is capable of authenticating the user by virtue of the fact that it is in the possession of the user. The access device 16 may comprise an off-the-shelf handheld device. For example, in this embodiment, the access device 16 may be a smart card, a card with a magnetic strip, a wireless electronic remote control key chain transmitter (sometimes referred to in the automotive industry as a key fob), a hand-held computer equipped with a wireless transmitter (e.g., Bluetooth transmitter, infrared transmitter, etc.) for transmitting an authentication code, or other device. If a handheld computer is employed (e.g., a PDA), the handheld computer may serve as both the user interface 14 and the access device 16.

Multiple hand-held devices 16 may be provided to allow access by different users (i.e., each device being provided to a different user). For example, multiple cards with magnetic strips may be provided to different users, with the magnetic strip of each card being uniquely encoded to allow the card (and thereby the user) to be uniquely identified. As will be apparent, the integrity of this arrangement is enhanced if any lost or stolen cards are immediately reported so that the lost/stolen card may be disabled. Alternatively, the access device 16 given to each user need not be unique. For example, each member of a group of technicians may be given access cards that are identical, and may each contain an identical code that is unique to the group but not to each individual member. In this embodiment, authenticating the user involves identifying the user as one of a group of individuals that is authorized to access a particular automation device, without specifically determining the identity of the individual. Herein, "authentication" refers to verifying the identity of an individual (or device), for example, by identifying the individual, by identifying the individual as a member of a group of individuals, and so on. As will be seen below, in the preferred embodiment, not only individuals but also devices, such as automation controllers, motor drives, sensors, actuators, and so on, are authenticated.

In another embodiment, the access device 16 comprises one or more sensors which may be used to obtain information useable to authenticate an individual. For example, the access device 16 may be a biometric measurement device configured to sense biometric information from the user. Again, this may be an off-the-shelf device. For example, the security access device 16 may be a retinal scanner configured to scan the retina of the individual that is attempting to gain access to the automation device 12. Alternatively, the security access device 16 may be a fingerprint reader configured to scan the fingerprint of the user. As another example, the security access device 16 may be a voice recognition device configured to receive an audible signal from the user (e.g., spoken words).

Combinations of identification techniques may also be used. For example, the access device 16 may comprise a PDA with a built-in fingerprint reader. The PDA may be configured to transmit both a unique code associated with the PDA and biometric information characterizing the fingerprint of the user of the PDA. The PDA may further serve as both the user interface 14 in addition to the access device 16.

The security interface 18 is configured to receive information from the access device 16 and to compare the information with stored information to authenticate the user. For example, the security interface 18 may compare a unique code received from a handheld device with a database of codes (e.g., where the access device 16 is a smart card, a card with a magnetic strip, a key fob transmitter, or a handheld computer). Alternatively, the security interface 18 may compare biometric information received from the access device 16 with biometric information stored in a database characterizing biometrics of authorized users (e.g., where the access device 16 is a retinal scanner, fingerprint reader, or voice recognition device). The security interface 18 may then authenticate the user if a code/biometric match is found, or not authenticate the user if no match is found, for example.

The security interface 18 may be located with the automation device 12, with the user interface 14, with the security access device 16, may be provided as a separate device, may be provided with combinations thereof (i.e., a separate security interface 18 for each), and/or may be provided with another device. For example, if the security access device 16 is a retinal scanner, the retinal scanner may include not only the sensor used to characterize the user's retina, but also the logic and stored information used to compare the biometric information characterizing the retina of the user with the information characterizing the retinas of authorized individuals. As another example, if the access device 16 comprises an off-the-shelf fingerprint reader connected to a universal serial bus (USB) port on the automation device 12, the logic and stored information used to compare the biometric information characterizing the fingerprint of the user with the information characterizing the fingerprints of authorized individuals may be stored in the automation device 12. The database of codes or biometric information accessed by the security interface 18 may be located with the automation device 12, with the user interface 14, with the access device 16, with the security interface 18, or at another location, such as by being distributed over multiple locations. Herein, the term "database" refers to any data storage arrangement and does not imply any organizational structure or other limitation.

In one embodiment, the security interface 18 is further configured to perform additional functions. For example, the security interface 18 may be configured to access stored information describing the access rights of the user (e.g., whether the user has read-only access or whether the user also has write-access, the types of information of information for which the user has write access, and so on), and to confirm that the user is authorized to engage in a particular data transaction (e.g., to read a certain piece of information, to write a certain piece of information, etc.). Such information may be stored in a database, such as in the database used to store the code, biometric, or other information as described above.

In another embodiment, rather than retrieve the access rights of the user from a database, the access rights of the user are included in the information received from the access device 16. In other words, the code transmitted by the access device 16 may include not only a code uniquely identifying the individual, but also a code specifying the access rights of the individual.

Other functions that may be performed by the security interface 18 may include implementing, ensuring and/or enabling such things as availability restrictions (determining when users can perform certain functions, ensuring that information is accessible to authorized participants while avoiding communication overload), archiving (vaulting of configuration history), recovery (restoring system configuration after changes were made), auditing (establishing electronic records and validation), reporting (providing traceable records showing who did what and when, or what happened and why), nonrepudiation (ensuring that it is possible to prove what happened, and who did what), privacy/confidentiality (ensuring that information is protected from being accessed by third parties), and integrity (ensuring that information is secure from unauthorized modification or manipulation). As will appreciated, some of these functions are overlapping.

Figure 2:
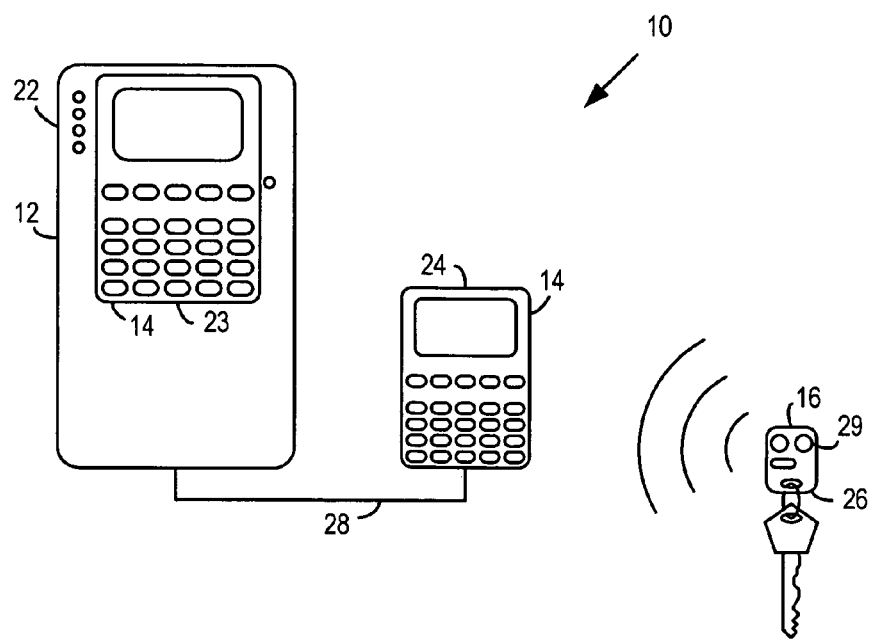
FIG. 2 is an industrial automation system which includes a motor drive and a key fob security access device.

FIG. 2 is a more detailed variation of the example of FIG. 1. For convenience, in FIG. 2, like reference numerals are used to refer to like parts as compared to FIG. 1. In FIG. 2, the security access device 16 is a key fob 26, and the automation device 12 is shown to be a motor drive 22.

As previously indicated, the user interface 14 may be integrated with or physically separate from the industrial automation device 12. In the arrangement of FIG. 2, both arrangements are shown: The motor drive 22 is accessible by way of an integrally provided (built-in) user interface 23 and by way of a non-integrally provided user interface 24. The non-integral user interface 24 may, for example, be a handheld user interface 24 that is connected by way of a cable 28 to an I/O port of the motor drive 22. A security interface 18 (not shown in FIG. 2) may be provided with the motor drive 22 and/or with the user interfaces 23, 24, for example, as previously described. Also, a database of individuals that are authorized the motor drive 22 may be stored in the motor drive 22, in the user interface 23, 24, or in another location.

Figure 3:
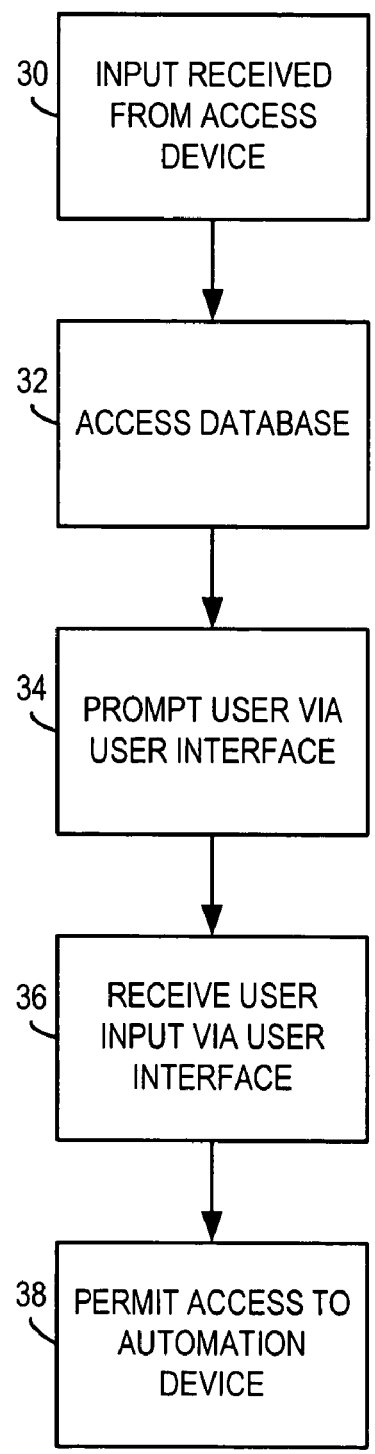
FIG. 3 is a flowchart showing the operation of the system of FIG. 2.

Referring now also to FIG. 3, in operation, the user presses one of the buttons 29 on the key fob 26 to access the motor drive 22. The keypress from the user is received by the button 29 and, in response, the keyfob 26 transmits a wireless, uniquely coded signal to the security interface 18 (step 30). The coded signal uniquely identifies the key fob 26 and therefore identifies a particular user assumed to be in possession of the key fob 26. In response, the security interface 18 matches the code signal against the information stored database and accesses the database to obtain additional information pertinent to the user based on the coded signal, including potentially a password for the user (step 32). Preferably, the security interface 18 causes one or both of the user interfaces 23, 24 to provide a prompt screen to the user (step 34). By way of example, it will be assumed for present purposes that the user accesses the motor drive 22 by way of the user interface 24, although it will be understood that the user interface 23 may also be used by the user to access the motor drive 22.

In one embodiment, the system 10 is provided in an environment in which other industrial automation devices are located that are compatible with (and that respond to) the key fob 26. The user interface 24 provides the user with a response screen to indicate that a key press from the key fob 26 has been detected. The response screen may prompt the user to enter a key press or otherwise manipulate a user input device on the user interface 24 in order to confirm that the user desires to access the motor drive 22. If the user provides the required response (step 36), then the user is permitted to proceed to access the motor drive 42 (step 38). If the user does not enter the required response on the user interface 24 within a predetermined period of time, the response screen may time out and the user interface 24 returns to its initial state.

In one embodiment, the response screen is a login screen. Accordingly, when the user presses the button 29 on the key fob 26, additional login screens may appear on other industrial automation in addition to that shown in FIG. 2. The login screen preferably requires at least that the user enter a password. The login ID for the user may also be entered by the user or may be automatically displayed to the user for convenience and to provide a visual acknowledgment of the user's key press. The login screen ensures that, when an authorized individual uses the key fob 26 to access a first industrial automation device, an unauthorized individual (i.e., an individual lacking authorization to engage in a particular data transaction) is not able to access a nearby industrial automation device based on the same key press. The unauthorized individual is prevented from accessing the second industrial automation device by virtue of the fact that a password must still be entered. Preferably, the password is customized to the holder/user of the key fob 26 as identified by the coded signal, such that a different password must be used in combination with each key fob 26. The login screen also ensures that, if the unauthorized individual happens to come into possession of the key fob 26, the unauthorized individual will not able to use the key fob 26 without knowing the password of the owner of the key fob 26. When no password is entered (e.g., as in the case where multiple industrial automation devices respond to the wireless transmission from the key fob 26 and the user enters a password on a different one of the industrial automation devices), or when the user is unable to enter the correct password, the screen times out and the user interface 24 returns to its original state prior to detection of the wireless transmission from the key fob 26.

If the user provides a login name and password (step 36), and if a comparison of the password received from the user in response via the login screen matches the stored information regarding the password of the user associated with the key fob 26, then the user is given access to the motor drive 22 in accordance with the user's access rights as specified in the information retrieved from the database (step 38).

In one embodiment, when a user gains or attempts to gain access at a first industrial automation device (e.g., by entering a password), the automation device broadcasts a message to other devices on the network. The purpose of the message is to alert the other automation devices that the user is in the process of gaining access, or has gained access, at the automation device, so that another user can not surreptitiously gain access at one of the other automation devices based on the same key fob press. Based on this message, the other automation devices may then prevent access to the second user. When the authorized user has logged out, a follow-up message may be sent by the automation device in order to allow the user to login to other automation devices.

In one embodiment, the access device 16 gives the user complete access to the automation device 12. Preferably, however, a multi-tiered access arrangement may be used, with different individuals having different levels of access to the motor drive 22. For example, some users may have read-only access whereas other users may have read-write access. Also, the parameters that may be accessed or the functions that may be performed may vary depending on access level. For example, the access rights may define various privilege classes to control users' ability to access memory of the device, create or delete data table files and program files, perform logical and physical reads or writes, change an operating mode of the device, clear memory, restore device memory, perform online edits, flash the memory, reset, autotune, clear faults/alarms, link read/write, resets, flashing, view diagnostics/events, upload configuration information settings, force I/O transitions, adjust operation of a drive or automation controller, and so on. Different classes may be defined which give different users different levels of access or different types of access to perform different functions. Also, access levels (e.g., read vs. read-write) may vary on a parameter-by-parameter basis. The access rights may also give certain users (e.g., administrators) the ability to add or delete users, modify password/privilege options, specify access rights, and so on. For example, one of the key fobs may be an administrator key fob, with complete ability to add additional users/key fobs to the database and to specify access rights of those users in the database.

The access rights may be administered not only by the user, but also as a function of other parameters, such as location of the user, job function of the user, time and/or date, system status, and/or by type or group of devices. For example, with respect to location of the user, access rights may be administered so as to allow the user to perform certain functions only at certain locations. For example, a particular user interface may be located adjacent to an emergency stop ("E-stop") switch for an automation device. By allowing the user to perform certain functions only from that user interface, it is possible to ensure that the user is able to visually monitor the effects of any changes made by the user and immediately press the E-stop switch in the event that any changes have unintended consequences. This also ensures that the user has passed through plant security and is on-site. With respect to date and time, access rights may be administered to reflect shift schedules and other time-dependent security issues. For example, a given user may only have access rights during the shift they are scheduled to be at work, and the same access rights may be given to other users during other shifts. With respect to system status, access rights may be administered to effect a lock-out arrangement. In other words, when a first user takes an automation device off-line to update control logic of the automation device, for example, the first user may be given "ownership" of the automation device such that access to the control logic by other users may be temporarily restricted until the work of the first user is complete.

Figure 4:
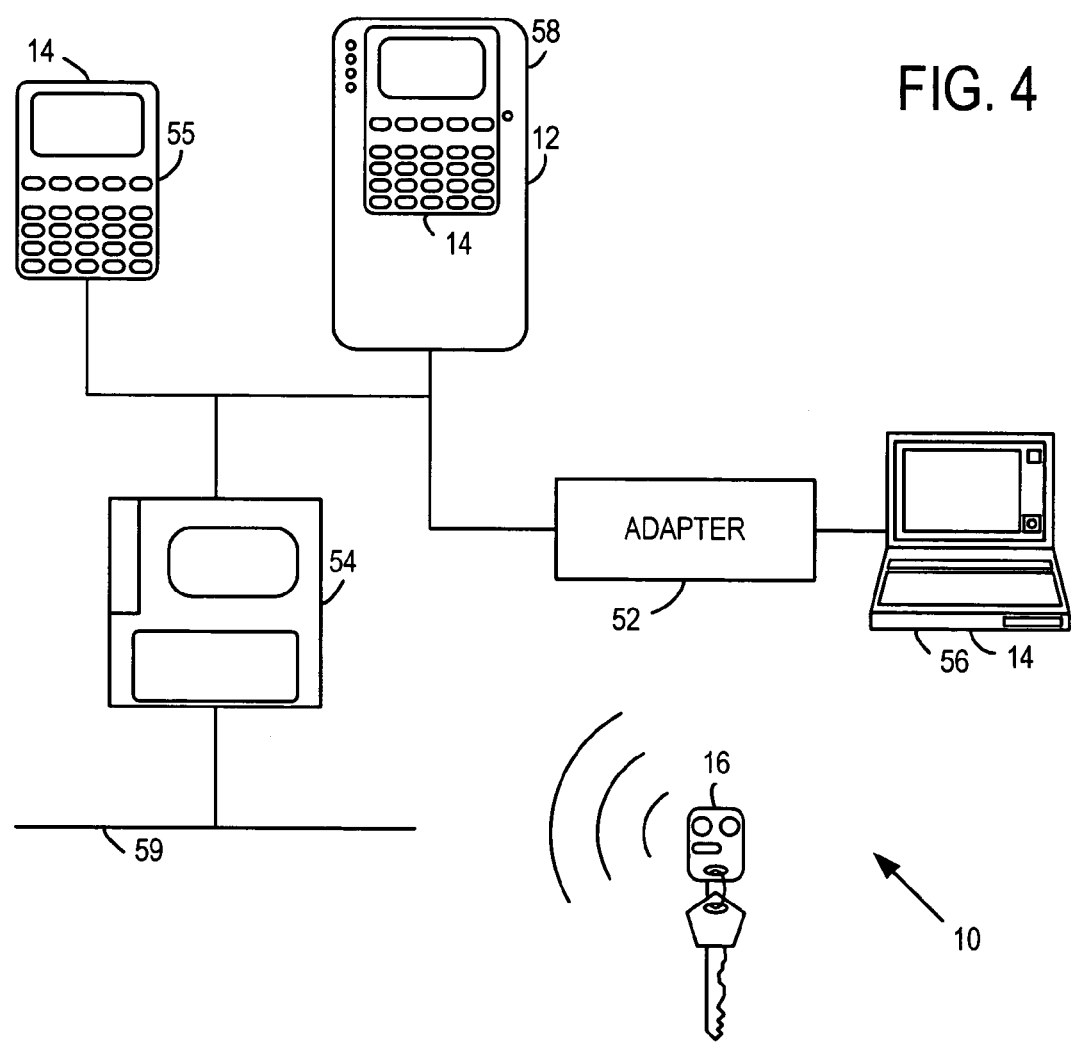
FIG. 4 is an industrial automation system which includes an automation device, a laptop computer, and a network interface.

Referring now to FIG. 4, as previously noted, the security interface 18 may be provided in a motor drive or an automation controller or it may be provided in a peripheral. FIG. 4 is another variation of the example of FIG. 1. In FIG. 4, a first peripheral in the form of communication adapter 52 connects a laptop computer 56 to an I/O port of motor drive 58 for point-to-point communication. Another peripheral 54 connects the motor drive 58 to a network 59. The peripheral 54 may, for example, be a communication adapter that connects the motor drive 58 to the network 59. Another user interface 55 is also connected to the motor drive 58.

As described previously, usernames and passwords associated with the security access device 16 may be stored in the security interface 18, which may locally manage security to authenticate users to their configured access levels. The security interface 18 may also obtain security information from a high level authority over the network 59.

The security interface 18 may be provided in the communication adapter 52, in the communication adapater 54, in the user interface 55, or in the motor drive 58. In one embodiment, the security interface 18 is provided in the form of a stand-alone device or as part of a separate peripheral connected to the motor drive 58. One reason for implementing the security interface 18 in this manner is to facilitate use of the techniques described herein with legacy equipment. For example, it may be desirable to incorporate the features described herein into existing equipment while eliminating or minimizing the overall number of modifications that need to be made to such equipment. Another reason is that, even for non-legacy equipment, it may be desirable for security to be handled by a peripheral so that changes in security do not result in the process controlled by the automation device having to be revalidated.

In one embodiment, the adapter 52, the adapter 54, and the user interface 55 may each be connected to a different communication port on the motor drive 58. Security may then be implemented by controlling the access level available through each port. For example, if the security interface 18 is located in the user interface 55, the user interface 55 may control the level of access to the motor drive 58 that is available through the other ports. When a user tries to write new configuration information to the motor drive 58 using the laptop computer 56, the user is first authenticated by the user interface 55. Upon authenticating the user, the user interface 55 may change the configuration of the port to which the adapter 52 is connected so that it is possible to write information to the motor drive 58 via that port. In this embodiment, the only port which always has complete read-write access to the motor drive 58 is the port to which the user interface 55 is connected. The user interface 55 is therefore able to control access to the motor drive 58 not only for users using the user interface 55 but also for users using the laptop computer 56 and for users connecting by way of the communication adapater 54.

In one embodiment, an access mask may be provided in the motor drive 58 that describes the accessibility of the motor drive 58 on a port-by-port basis. For example, one bit in the mask may indicate whether read access is permitted through a given port, and another bit in the mask may indicate whether write access is permitted through a given port. The peripheral may then write to the access mask in order to configure the accessibility of the drive on a port-by-port basis. A ping message transmitted to the devices connected to the ports on the motor drive 58 may then be transmitted so that all peripherals know which ports have access in real-time. Preferably, the access mask is contained in the motor drive 58, so that removal of the peripheral (e.g., if the peripheral is a portable human-machine interface) does not pose a problem. It may also be desirable for the motor drive 58 to provide information when access to a given port is denied. For example, if no access is available through a given and a device tries to access the motor drive 58 via that port, an error message such as "secured host: port 1 write access not allowed" may be provided.

Figure 5:
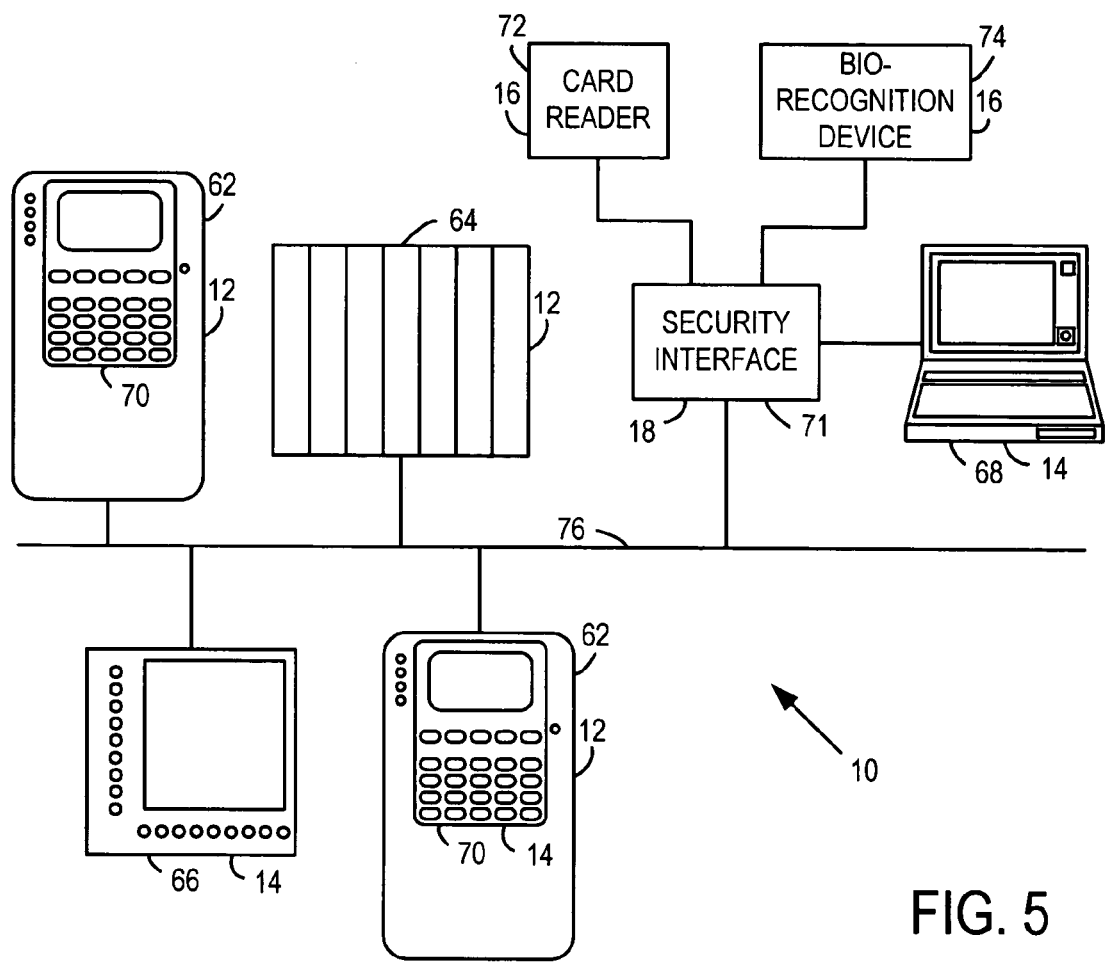
FIG. 5 is an industrial automation system which includes a plurality of industrial automation devices and a plurality of security access devices connected by way of a communication network.

Referring now to FIG. 5, as previously indicated, the automation device 12 shown in FIG. 1 may be connected to an automation control network. FIG. 5 is another variation of the example of FIG. 1. In FIG. 5, the industrial automation devices 12 are shown to include a plurality of motor drives 62 and an automation controller (e.g., a rack mounted programmable controller system) 64. User interfaces 14 include a panel display-type HMI 66, a laptop computer 68, and user interfaces 70 that are integrally provided with the motor drives 62. A security interface 71 is connected to a card reader 72 and a biorecognition device 74. Again, other access devices may be employed. The motor drives 62, the automation controller 64, the HMI 66, and the security interface 71 are all connected to control network 76. In one embodiment, the control network 76 is a closed, proprietary network. In another embodiment, the control network 76 is an open, non-proprietary network, that is, any computing device (e.g., desk top computer, laptop computer, handheld computer, etc.) may communicate on the control network 76 so long as it has been adequately configured with suitable drivers or other software, and such drivers/other software may be commonly available for little or no cost.

In a network configuration, it may be desirable to have each automation device 12 enforce access restrictions locally. Accordingly, in one embodiment, the motor drives 62, the automation controller 64, and the HMI 66 each include security interfaces 18 (not shown). Security is therefore provided locally and at the device level. In this arrangement, preferably, only devices that operate through a security interface are able to be authenticated. Communication between two participants (e.g., a motor drive and an automation controller, two automation controllers, a user interface and a motor drive or an automation controller, and so on) at least initially begins with authentication of one or both of the participants in the communication through cooperation of the respective security interfaces associated with the two devices. Devices that cannot be authenticated are given little or no access. This prevents a rogue tool from gaining access to an automation device by pretending to be another automation device, such as by pretending to be an automation controller that is communicating configuration information to a motor drive.

In another embodiment, only some devices are provided with a security interface. For example, for reasons of cost and simplicity of implementation, some devices may not be provided with a security interface if protection for a given device is deemed to be non-essential. For example, a security interface may not be provided for a sensor that measures a non-critical parameter or an actuator that effectuates a non-critical output (e.g., an indicator). It will be appreciated that the security interface 18 need not be identical for each device but rather may be configured/optimized based on the type of device (workstation, motor drive, automation controller, and so on), based on the type of network (enterprise network, control network, and so on) with which it is configured to operate, and so on. Different security interfaces 18 may have different levels of functionality depending on the device to which it is connected. A simple programmable sensor, assuming it has a security interface 18, may not require the same degree of protection or level of functionality as an automation controller.

In general, each automation device 12 may communicate with a human user using a user interface or with another automation device. In the case of communication with a human user, in FIG. 5, such communication may occur by way of the laptop computer 68, for example. In this case, the user may be authenticated by the card reader 72 (e.g., for reading a card with a magnetic strip) or by a biorecognition device 74 (e.g., a finger print reader or a retinal scanner). The security interface 71 may have a port that allows the security interface 71 to be connected to the laptop computer 68 (e.g., by way of a USB or Ethernet port). As generally described above in connection with FIGS. 1-2, after receiving the input from the card reader 72 or biorecognition device 74, the security interface 71 may then prompt the user via the laptop computer 68 to provide a password. Upon receiving the password, the security interface 71 completes authentication of the user.

In the case of communication with another automation device, manual entry of a login name and password is not necessary. Preferably, however, identification information is still stored within each device to allow each device to identify itself. A list of authorized users/devices and access levels for each user/device may then be maintained by each automation device 12. Particularly, each automation device 12 (or at least those which have a security interface) may store a list of users and automation devices that are allowed access to its information and the level of access that is permitted.

Identification information for users and devices may then be transmitted by way of the network 76 to allow the user/device to obtain access to a given automation device 12. For example, in the situation where a human user is attempting to access one of the motor drives 62 from the laptop computer 68, the security interface 18 located in the motor drive 62 may receive the information from the access device 16 (e.g., a signal identifying the access the access device 16 and thereby the user). Receipt of this information by the security interface 18 located in the motor drive 62 occurs indirectly by way of the security interface 71. The process of authenticating the user by comparing the information received from the access device 16 with stored information concerning the user may be performed by the security interface 71 or by the security interface 18 associated with the motor rive 62. In either case, though, the information from the access device 16 ends up at the security interface 18 associated with the motor drive 62, either in pre-authenticated or post-authenticated form. The security interface 18 may then compare the identity of the user with its stored list of users/devices that are allowed access to the information in the motor drive 62 and determine the level of access that is permitted based on the stored information.

Alternatively, if it is the automation controller 64 that is attempting to access the motor drive 62, then the identification information may be sent from the security interface 18 of the automation controller 64 to the security interface 18 of the motor drive 62. Again, the security interface 18 of the motor drive 62 may then compare the identity of the automation controller with its stored list of users/devices that are allowed access to the information in the motor drive 62 and determine the level of access that is permitted based on the stored information.

In one embodiment, in order to prevent a rogue tool from listening to network traffic to discern identification information of authorized users/devices, the identification information is transmitted on the network 76 in encrypted format. For example, a symmetric key encryption arrangement may be used in which all devices having a security interface 18 are provided with a public key and a private key, with all devices knowing the public keys of all the other devices. For the automation controller 64 to transmit its identification information to the motor drive 62, for example, the automation controller 64 may encrypt its identification information using the using public key of the motor drive 62. The automation controller 64 then transmits both encrypted items (the identification information and the symmetric key) to the motor drive 62. The motor drive 62 uses its private key to decrypt the symmetric key, and then uses the decrypted symmetric key to decrypt the identification information of the automation controller 64. A variety of other arrangements may also be used for authenticating other automation devices 12 and/or for transmitting identification information back and forth on the network 76 in secure fashion.

In the embodiment described above, a separate access list with user identification and access rights information is preferably stored at each automation device 12. This allows security to be handled locally and avoids a single point of failure. In another embodiment, the list may be centrally maintained at a central authority. This would facilitate global updates to the access lists, e.g., to add a new employee to a number of lists at once. In like manner, identification and password information for human users may be stored at each security interface 18. The system may be configured such the user's password or other information may be updated only locally at each security interface 18, or a central authority may be used to update the user's password across multiple security interfaces. If desired, a default level of access may also be allowed for users/devices that are not on the list of authorized users, which may be a minimal level of access.

The system of FIG. 5 has a number of features. First, it provides device-level security in a network environment. Each automation device 12 is ultimately responsible for enforcing access restrictions in connection with the I/O data and configuration information stored therein. Because security is handled locally, with a security interface 18 provided for each device, a server or other central authority is not needed to prevent unauthorized access by rogue tools or to allow authorized access by a user. Additionally, the automation devices 12 are provided with and support a consistent authentication and authorization system. The system is the same for both human users accessing the control network by way of a user interface and for automation devices connected to the control network as part of a networked control architecture. Automation devices 12 that include a security interface 18 and support the authentication and authorization system are able to prevent access by rogue tools. Accordingly, the automation devices 12 are protected from rogue tools that may be connected to the network 76. At the same time, authorized tools, such as the laptop computer 68, may obtain access to any/all of the automation devices 12 that are connected to the network 76. Accordingly, the laptop computer 68 may execute software tools such as enterprise management tools that may be used to monitor operation of the automation system. Examples of such tools will be described below. Further, users do not need to remember different passwords for different devices. A single password may be used for all devices in the entire system. This makes it practical to avoid the use of semi-secret "back doors" that are configured to allow access in the event of a forgotten password, but that are also susceptible to allowing unauthorized access.

Figures 6, 7:
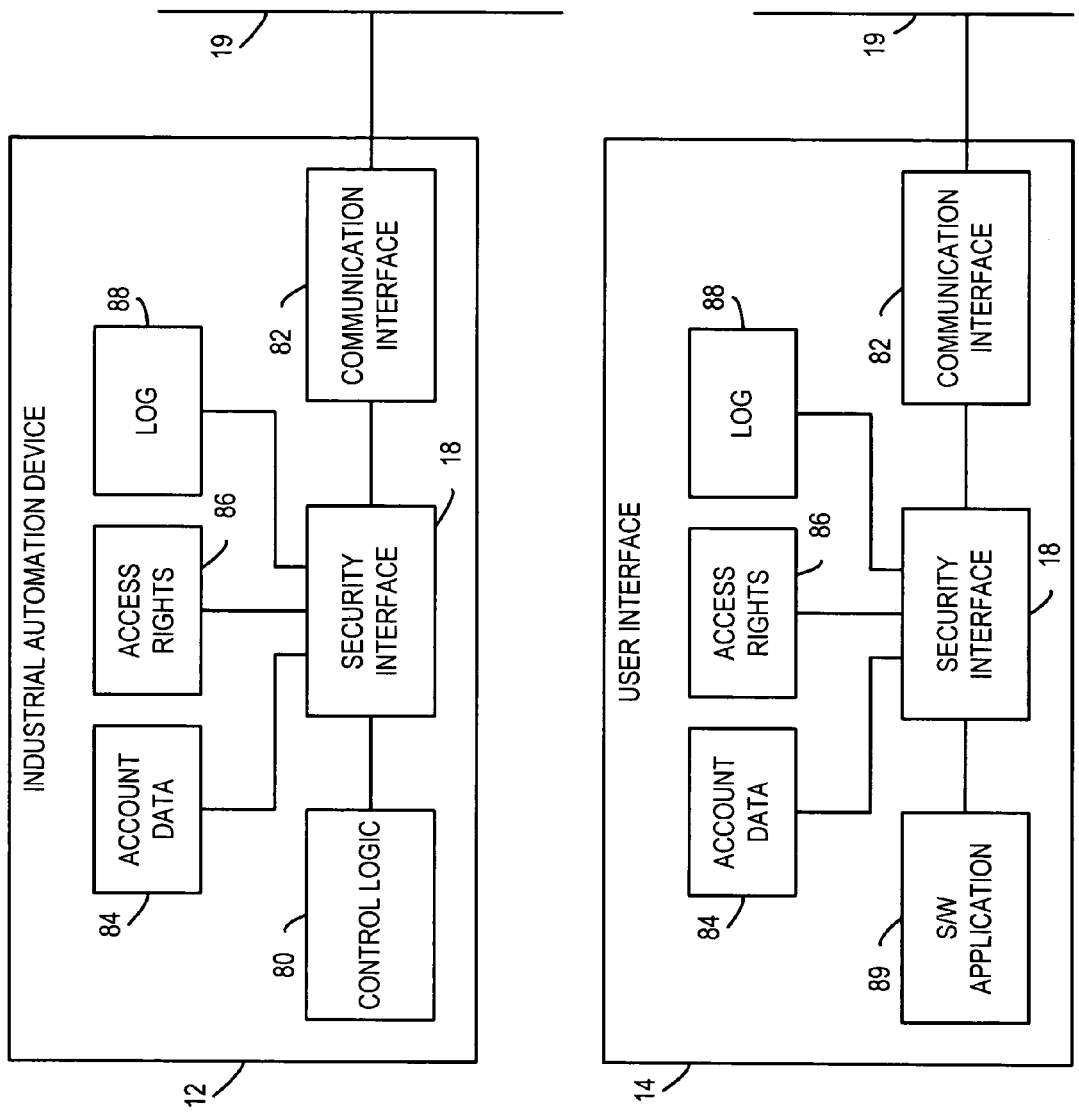
FIG. 6 is an industrial automation device of FIG. 1 shown in greater detail.
FIG. 7 is a human-machine interface of FIG. 1 shown in greater detail.

Referring now to FIG. 6, the arrangement of security interface 18 is shown in greater detail for the example of the automation device 12. In the example of FIG. 6, the security interface 18 is provided integrally with the automation device 12. As previously mentioned, the security interface 18 may also be provided separately or may be located in another device.

In the case of an automation device 12, the security interface 18 is preferably connected to control logic 80, communication interface 82, account data storage area 84, access rights storage area 86, and log storage area 88. It may be noted that the control logic 80, the communication interface 82, the account data storage area 84, the access rights storage area 86, and the log storage area 88 are present in the arrangements depicted in other Figures in which the security interface 18 is shown, even though they are not specifically depicted.

The control logic 80 is logic that the automation device uses to control or monitor at least part of an industrial process. For example, for a motor drive, the control logic 80 comprises the logic that is used to control operation of an electric motor controlled by the motor drive. For an automation controller, the control logic 80 may comprise logic that is used to control the output states of a plurality of output devices based on input states of a plurality of input devices, such as logic embodied in an RSLogix program. For a sensor or actuator, the control logic 80 may comprise logic used to control operation of the sensor/actuator, to scale outputs, and to perform other signal processing.

The communication interface 82 comprises communication drivers and other logic used to connect the automation device 12 to a communication link 19, such as a point-to-point link or a communication network. The account data storage area 84 stores information identifying individual users. For example, the account data storage area 84 may be used to store login IDs, passwords, and other identifying information for use in authenticating an individual user using the security access device 16 (e.g., biometric information, codes associated with handheld access devices, and so on). If identification information is transmitted between devices in an encrypted format, the account data storage area 84 may also store information to facilitate this process (e.g., public key information of other devices, as discussed above).

The access rights data storage area 86 stores information concerning what access rights individual users/devices possess. For example, as previously indicated, the access rights data storage area 86 may define various privilege classes to control users' ability to modify password/privilege options, access memory of the device, create or delete data table files and program files, perform logical and physical reads or writes, change an operating mode of the device, clear memory, restore device memory, perform online edits, flash the memory, reset, autotune, clear faults/alarms, link read/write, resets, flashing, view diagnostics/events, upload configuration information settings, force I/O transitions, adjust operation of a drive or automation controller, and so on. Different classes may be defined which give different users different levels of access or different types of access to perform different functions. Also, access levels (e.g., read vs. read-write) may vary on a parameter-by-parameter basis.

In operation, communication between the control logic 80 and the communication interface 82 (and thereby communication link 19) passes through the security interface 18. Therefore, any message that comes in from the communication link 19 is evaluated by the security interface 18. In one embodiment, the information may be received from a user interface 14 that is directly connected to the automation device 12, as described above in connection with FIGS. 1-3, such that the user is authenticated by reference to the account data storage area 84 in a manner as previously described. In another embodiment, the information is received from an automation device 12 or user interface 14 with its own associated security interface 18, e.g., over a network as described above in connection with FIG. 5, such that the transmission is a secure transmission and the requesting user/device has already been authenticated. If the message is a request for data, the security interface 18 identifies whether the requesting user has read-access rights for that data and, if so, provides the requested data to the user. If the message is a request to write an output, the security interface 18 identifies whether the requesting user has permission to has write-access rights for that data and, if so, writes the data as requested. In this case, for example, the automation device 12 may be an actuator and the user requesting to write data to the actuator may be an automation controller.

The log storage area 88 is used to store information about changes to configuration information for the automation device 12, including when the change was made and the identity of the user/device that made the change. The log storage area 88 may be used to maintain a comprehensive list of all changes made to the automation device 12 as well as other information. For example, records may be kept of any data transaction that occurs which requires access rights, such as those described above in connection with the access rights data storage area 86.

With reference to FIG. 7, FIG. 7 is similar to FIG. 6 except that it shows the security interface 18 in the context of a workstation or other user interface 14. Instead of control logic 80, application software 89 is shown. The application software 89 comprises software tools that may be used by the user, e.g., to obtain a device level view of a particular automation device 12 or to obtain system-level information relating to the overall automation system 10. Examples of such tools are described in greater detail below in connection with FIG. 10. Again, the security interface 18 may be used to authenticate a human user, as generally described above in connection with FIGS. 1-3. The user interface 14 may then communicate with other devices on the network 19, including devices with an associated security interface 18, in order to gather information about the operation of the automation system.

Figure 8:
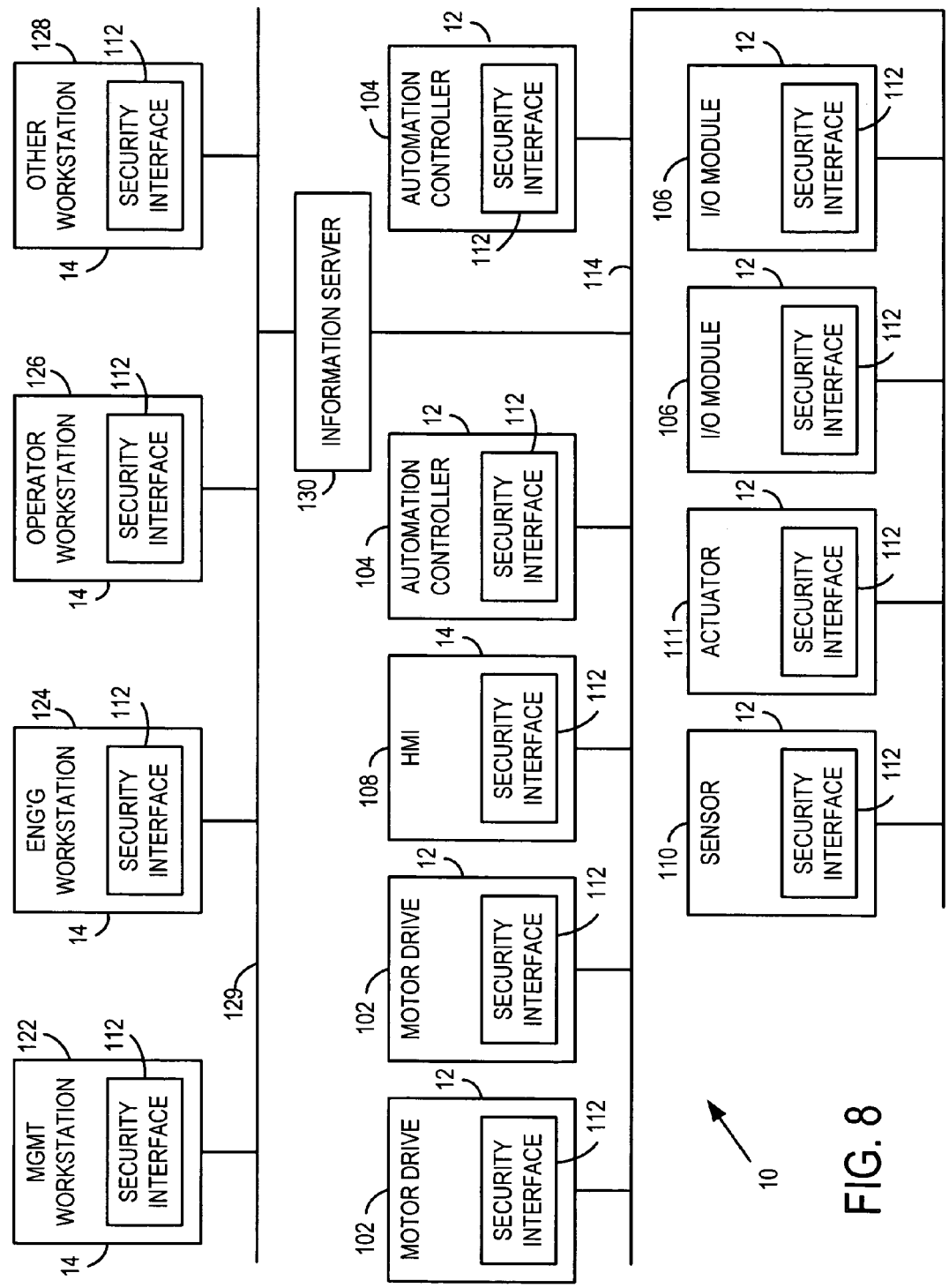
FIG. 8 is an industrial automation system which includes an information server and a plurality of security interfaces located locally with respective industrial automation devices.

Referring now to FIG. 8, an industrial automation system is shown which combines the security offered by the access device 16 with further additional features. The industrial automation system comprises a plurality of industrial automation devices 12 including motor drives 102, automation controllers 104, I/O modules 106, HMIs 108, sensors 110, and actuators 111 which each include a security interface 112 and which are each connected to a control network 114.

The system further includes a plurality of workstations 122-128 which are connected to a network 129 by way of respective security interfaces 112. Again, it will be appreciated that the security interface 112 need not be identical for each device but rather may be configured/optimized based on the type of device (workstation, motor drive, automation controller, and so on), based on the type of network (enterprise network, control network, and so on) with which it is configured to operate, and so on. Also, while the security interfaces 112 are shown as being embedded within each of the devices 102-111 and workstations 122-128, it will be appreciated that the functionality of the security interface 112 may be provided via a separate stand-alone peripheral.

In one embodiment, the network 114 is a control network and the network 129 is a management information system network. The control network 114 may, for example, be provided in accordance with the ControlNet or DeviceNet automation network standards. Control networks are typically highly deterministic. The network 129 is a general-purpose network associated with business/management information systems in an office environment (as opposed to a plant-floor environment) (e.g., a company-wide intranet). The network 129 may be used to connect personal/laptop computers, such as used in office-wide intranets, extranets, and also including the Internet. The network 129 may, for example, be an Ethernet-based network.

The system 100 further comprises an information server 130 which is connected to the network 110 and to the network 129. Although the information server 130 is depicted as being located between the networks 114 and 129, it will be appreciated that other configurations are possible. For example, one or more bridges or gateways may also be used to interconnect separate networks. Additionally, while the information server 130 is shown as a separate component, it will be appreciated that other configurations are possible. For example, the functionality of the information server 130 may be distributed to the individual automation devices 12.

The information server 130 standardizes communication from different automation devices, manufacturing execution systems, and external business computing systems including databases to connect the automation devices to each other and to the manufacturing execution systems and external business systems. The information server 130 provides a common framework for communication by offering a consistent format for sharing data, allowing users to share information from the automation devices 12 with the rest of the enterprise. The information server 130 preferably resides on a separate server, although the separate server may be a virtual server and the server may be hosted on a computer that is also hosting another server.

Figure 9:
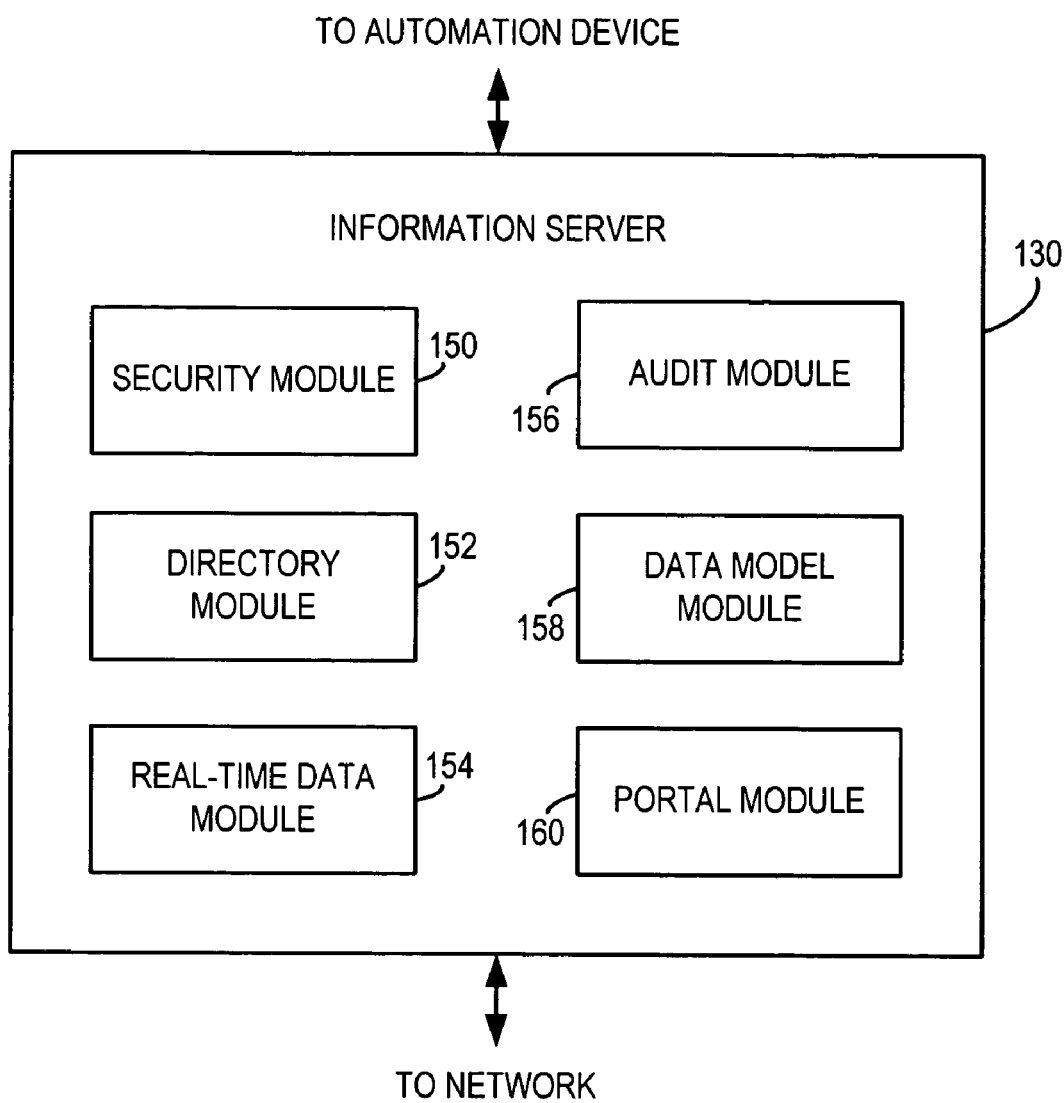
FIG. 9 is an information server of FIG. 8 shown in greater detail.

Referring now to FIG. 9, FIG. 9 shows the information server 130 in greater detail. The information server 130 comprises a security module 150, a directory module 152, a real-time data module 154, an audit module 156, a data model module 158, and a portal module 160.

The security module 150 cooperates with the other modules 152-160 to provide security features in the context of a system which uses an information server 130. For example, to the extent desired, the security module 150 may be used to centrally manage at least some of the security features. For example, in one embodiment, described above, it is desirable to have the access rights managed entirely locally at each device. In another embodiment, for convenience, it may be desirable to change the security configuration of multiple devices simultaneously over the network. This arrangement is more convenient in as much as it allows access rights to be managed from a single location. Other features of the security module 150 are described below.

The directory module 152 provides a directory or common address book of the automation devices 12, user interfaces 14, related parameter names (e.g., tags), and other parameters and devices located in the automation environment. For example, when a system programmer is programming the automation system 10 using a programming tool, the user may assign parameter names (e.g., tags) to I/O points, which may be real or virtual, or to other devices (e.g., sensors, actuators, and so on). Such parameter names may be used in the control program to refer to a particular device or I/O point. Through the directory module 152, such parameter names may then be made available for browsing and access in other tools. For example, if a second system programmer is programming a user interface for the automation system, the second system programmer may use the directory module 152 to browse and access the parameter names assigned by the first programmer in the control program. The directory module 152 provides a distributed namespace. That is, the directory module 152 preferably is not a single database, but rather allows data to reside in multiple places. The directory module 152 provides searchable references to resources stored anywhere across a distributed system. Users may, therefore, perceive the directory module 152 as one searchable single database.

Preferably, parameter names are not hard coded to the physical location of devices or I/O points. The directory module 152 maintains information regarding physical locations separately from information regarding device names. This allows programmers to define resources and resource groupings once and then reuse them repeatedly. A large distributed system may be programmed on one computer, taken to an automation environment and deployed to the correct locations by simply changing the name of the hardware on which the parameter resides. This also works in reverse, by allowing users to go out to a site, move the deployed system onto a notebook computer, modify it and then re-deploy it. Entire duplicate entire HMI projects can be duplicated and logic programs from entire lines or areas of an application and can be reused in the same application.

The directory module 152 may be used to support centralized management of the security features described herein. For example, using the directory module 152, a system administrator responsible for setting the access rights of various users may quickly browse various automation devices and/or I/O points in the automation system to set the access rights of a user, potentially on a device-by-device or parameter-by-parameter basis. The security module 150 (and/or the security interfaces 18) may also be used to limit a user's ability to view and access information by way of the directory module 152.

The real-time data module 154 provides reliable, enterprise-wide access to real-time information from the automation system 10. The real-time data module 154 provides services that transfer high-speed manufacturing data among multiple processes throughout the system and make it available for browsing from software tools executing in the workstations 122-128, allowing the workstations 122, 124 to have an up-to-date view of what is happening in the automation environment. The information may come, for example, from any of the automation devices 12 shown in FIG. 8.

Preferably, the real time data module 154 operates to retrieve data on an as-needed basis and pass it along to the requesting entity. Data remains distributed in its original, native environment (e.g., at the motor drives 102, at the automation controllers 104, etc.), rather than being transferred retrieved and stored in a central location. This avoids storing the information in a central database that could be a single point of failure.

The security module 150 (and/or the security interfaces 18) may be used to limit access via the real time data module 154 to data stored in the automation devices 12 in accordance with access rights of individual users. In one embodiment, the information server 120 may operate to pass identification information back and forth between to allow the automation device 12 to authenticate a requesting user. The decision whether to grant a particular user/device is handled locally, at the device level. The information may be passed once, or a secure connection may be established between the automation device and the workstation. In another embodiment, the decision whether to grant a particular user/device is handled by the information server 130. In this arrangement, the system 10 may be configured such that the information server 130 is given full access to all of the automation devices 12 in the system 10. The responsibility then rests with the information server 130 to determine whether a particular user/device has authorization to engage in a particular data transaction with another automation device. To this end, access rights of each of the users/devices may be stored and centrally managed at the information server 130.

The audit module 156 maintains a comprehensive list of all changes made to the industrial automation system. The audit module may be implemented at least in part using the log storage area 88 located within each automation device 12, as described above in connection with FIG. 6. Alternately, the audit module 156 may be implemented using a central database which stores a comprehensive, central record of all changes made to the automation control system. Any changes that are made to the system are forwarded on to an audit database, which includes details on what changes were made, when and by whom. Such records may contain detailed information about the product as it was manufactured, stored, and released; the process used to manufacture a product; and other information. Audit messages are generated when users log into the system, change data configurations, or change I/O configurations. The audit module 156 routes these audit messages from all participating devices to a central audit log for storage and analysis. Because all users are authenticated, a high level of certainty is achieved that the details on what changes were made, when, and by whom, are correct.

The data model module 158 provides a common terminology used to describe operations in the automation system 10. The data model module 158 allows software applications to store, log and view data the same way, based on a repository of information about how the automation environment operates. For example, a user can install one software product and include information about the way a plant operates. Then, when a second product is installed, that information can be reused, thereby avoiding the need to gather it again. Advantageously, this provides a single, reusable, consistent view of the automation environment delivered throughout the enterprise.

The portal module 160 provides global access to production data and manufacturing reports from an Internet browser or related remote device. The workstations 122-128 may connect to the information server 130 by way of the Internet to obtain access to real-time manufacturing information. The information server 130 may also be made available to other handheld computing devices, such as personal digital assistants. As with the real time data module 154, the security module 150 (and/or the security interfaces 18) may be used to limit access to data stored in the automation devices 12 via the portal module 160 in accordance with access rights of individual users. In one embodiment, the system may be configured such that access rights are also a function of the manner in which the workstation is connected to the information server 130, in addition to being a function of the particular user trying to access the information. For example, if a workstation is connected to the information server 130 by way of the Internet, the user may be given more limited access rights. For example, the user may be allowed to view data but not write data. This would provide a higher level of security against Internet threats.

Figure 10:
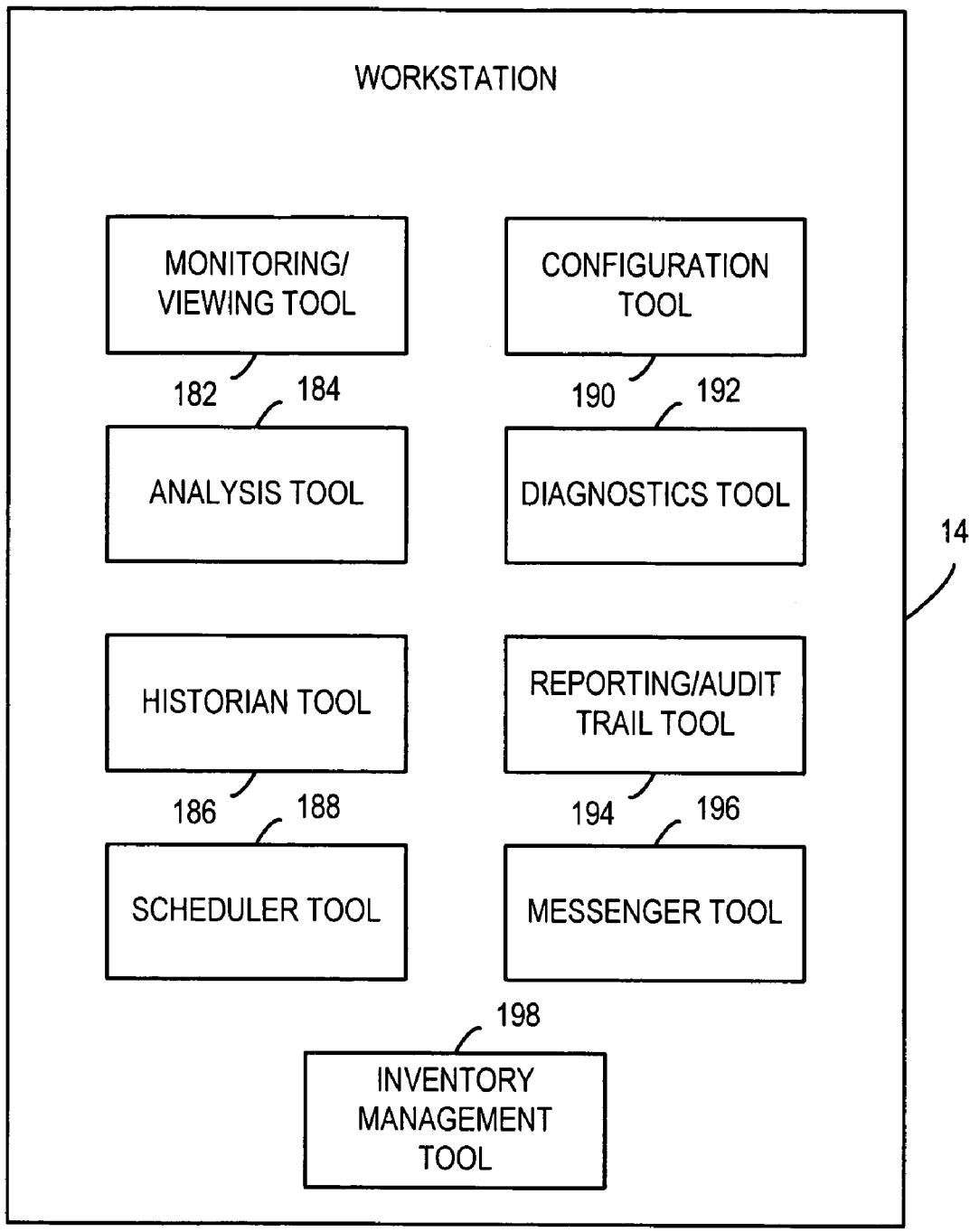
FIG. 10 is a workstation including set of software tools of FIG. 8 shown in greater detail.

Referring now to FIG. 10, a number of exemplary software tools 182-198 that may be made available by way of the workstations 122-128 are shown. In general, the software tools 182-198 may be made available to technicians, engineers, and management personnel in designing, operating, and maintaining the automation system and related business operations. The software tools 182-198 may access data stored throughout the automation system 10, including from automation controllers, motor drives, individual sensors and actuators, and so on.

In general, in operation, the tools 182-198 may be used to provide various information including device-level and system-level views, reports, and so on, as described below. Accordingly, execution of the tools 182-198 requires that information be obtained from the automation devices 12. A user at one of the workstations 122-128 may be authenticated in the manner previously described. Access to this information may be handled on a device-by-device basis. Alternatively, using the security module 150, the user may be given access to certain views/reports that, in order to be generated, requires access to certain information in the automation devices 12 to which the user would not otherwise have access. That is, the views/reports may be such that it is considered acceptable for the user to have access to the reports, even though the user is not permitted access to the underlying information used to generate the them from the automation devices 12. In this arrangement, the access rights of the user to obtain such views/reports may be managed by the security module 150.

Assuming by way of example that the user is using workstation 122 to execute software tool 182, the user may be authenticated by the security interface 112 associated with the workstation 122. For example, a user may be authenticated by biometric information (e.g., using a fingerprint reader or a retinal scanner connected to the security interface 112 of the workstation 122, or by having a handheld security device, or by another mechanism. Once the user has been authenticated, the user is provided with access to some or all information in the automation system 10. Access is provided in as much as the user is able to use the software tool 182 (or one of the other software tools 184-198), which needs access to the information in the automation system 10 in order to completely operate. The workstation 122 may transmit a request for information along with the identity of the user to the information server 130 or to individual automation devices 12, depending on how the system is configured. In one embodiment, the information server 130 may respond to the request for information, as described above. In another embodiment, the request for information is passed along to individual automation devices, which then provide the requested information. It will be appreciated that the identity of the user may be provided each time information is requested, or a secure connection may be established in order to avoid the need to transmit identification information each time. It may also be noted that the software tools 182-198 may be made available by way of a web browser. In this instance, the user may enter a URL address, and the program logic associated with the software tools 182-198 may reside on the automation system side of the Internet.

The exemplary software tools 182-198 that may be made available by way of the workstations 122-128 will now be described. The tools 182-198 may be supported by the modules 150-160 described above in connection with the information server 130. As elsewhere, it will be appreciated that the following are merely presented as examples. Different, fewer or additional tools may also be provided.

A viewer tool 182 provides enterprise-wide access to real-time manufacturing information using the real-time data module 154. Real-time manufacturing data, such as may come from the motor drives 102 and/or the automation controllers 104, is available immediately to all remaining devices in the automation environment. Accordingly, the workstations 122-128 may be provided with reliable, real-time manufacturing data while providing machine status reports, operating diagnostics, and audit trails.

Based on identification of the user, the information that is presented may be customized to the user, or may be presented in a manner that is customized to the user. For example, the information that is presented, or the way the information is presented, may be customized based on the job function of the user.

Individual machines or small processes may be monitored. The viewer tool 182 may support trending, alarming, data/activity and alarm logging, and so on. The viewer tool 182 may be used to monitor runtime activity of automation processes or to monitor network health. A graphics editor may be provided with drawings objects to support real time animation of the automation system. Graphical images of a plant or machinery may be combined with other information to provide a pictorial view of the status of a plant. Graphical images may be acquired and transmitted, and combined with real-time plant information. Alarms may also be controlled and set using the viewer tool 182.

An analysis tool 184 may be used to evaluate the performance of the industrial automation system by providing tools to identify causes of downtime, increase output by accurately measuring the efficiency of equipment, measure scrap/defect rates, capture changeover measurements accurately, measure production components, identify drifting parameters in real-time, and so on. For example, real-time data may be monitored and historical trending information from data logs may be provided. Variables may be plotted against each other (x-y plotting), or may be plotted against time.

A historian tool 186 may provide data integration and analysis tools. For example, the historian tool 186 may be used to analyze process variability by analyzing a process and production data such as temperatures, pressures, and flow rates. The historian tool 186 may be used to analyze process variability with historical knowledge of past performance. The historian tool 186 may be used to identify drifting process parameters in real time. The historian tool 186 may be used to edit performance parameters without interrupting data collection.

A scheduler tool 188 allows a detailed schedule to be developed to track labor and material, equipment resources, and so on. Through the scheduler tool 188, the user may be provided with information useable to identify and act on late orders; manage capacities and constraints, including labor and material; and determine the consequences of making changes, such as expediting orders. The scheduler tool 204 allows resource management and provides time to react to any unintended consequences. The information provided by the scheduler tool 204 considers factors that reduce the ability of a production resource to process, including shift patterns, labor/tooling/material availability, planned maintenance, current loading, and capacities. The scheduler tool 204 may be used to generate realistic production sequences, provide information regarding the effects of schedule changes, and provide more accurate delivery dates.

A configuration tool 190 allows device configurations to be managed and verified. The configuration tool 190 allows the configuration of the automation devices 12 to be centrally managed.

A diagnostics tool 192 provides a consistent way of logging system activity information for each of the devices in system 10, which can then be used for diagnostic purposes. The diagnostics tool 192 may be used to display diagnostic messages generated by the automation devices 12. For example, the diagnostic messages may be displayed to a user while developing applications and at runtime. Operator actions and changes that occur to a running system may be captured and archived in order to facilitate compliance with industry and government regulations. Diagnostic information may be gathered locally at the automation devices 12 and then transmitted to a central repository.

A reporting/audit trail tool 194 may be used to generate detailed reports showing an audit trail of all changes to the automation system. Preferably, information concerning all log in attempts, including user name, machine name, and time is tracked and stored. Records may then be viewed by the user. A detailed audit trail of all changes to configuration data initiated by users may be maintained. Information concerning changes to automation processes may also be provided. For example, for recipes, some examples of user-initiated changes that may be displayed are adding steps to a recipe, copying a step, overwriting an existing recipe or area model, or creating a new recipe or area model.

A messenger tool 196 may be provided to provide alarm annunciation, paging, and messaging tools. Messages may be sent via pagers, faxes, e-mail, telephones, cell phones, or locally on a computer (e.g., using a sound card). Scheduling functions may also be incorporated, such that alarms may be sent to particular individuals in accordance with the work schedules of the individuals (who is "on call"). Security may be implemented such that individuals are only given access in accordance with the schedules. For example, if an individual is not scheduled to be working, that individual is not given access to automation devices. Alternatively, an individual that is "on call" may be given access only after an alarm notification is sent.

An inventory management tool 198 may be used to facilitate just-in-time material management to batch execution systems, allowing more effective management of materials and recipes. The inventory management tool 198 tracks consumption of raw materials and other resources by receiving operational data from the automation devices 12. For example, if a particular resource is used in the fabrication of a particular product, the inventory management tool 198 may receive information from the automation devices 12 to determine how many such products have been produced and therefore how many resources have been consumed. This information may then be used to update inventory records in an inventory management system, for example, to order more materials and resources. This facilitates supply chain optimization and e-business fulfillment.

It should be noted that although flow charts may be provided herein to show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention will be described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. An industrial automation system comprising:
   a security access device;
   an industrial automation device;
   a user interface configured to provide a user with access to data stored inside the industrial automation device;
   a first security interface configured to receive information from the access device and, based on the information received from the access device, to provide authorization for the user to access the data stored inside the industrial automation device using the user interface;
   a second security interface;
   a communication network coupled between (i) the combination of the industrial automation device and the first security interface, and (ii) the combination of the user interface and the second security interface;
   a plurality of additional automation devices coupled to the communication network;
   a plurality of additional user interfaces coupled to the communication network; and
   a plurality of additional security interfaces, wherein the plurality of additional security interfaces are respectively associated with different ones of the plurality of additional automation devices and the plurality of additional user interfaces;
   wherein communication between participants formed of combinations of respective ones of the plurality of additional automation devices requires, at least in some instances, authentication of at least one of the participants in the communication, the authentication being performed using the security interfaces associated with the participants in the communication; and
   wherein communication between participants formed of combinations of respective ones of the plurality of additional automation devices with respective ones of the plurality of additional user interfaces requires, at least in some instances, the authentication of the respective user interface by the security interface of the respective automation device.

2. A system according to claim 1, wherein the industrial automation device comprises a motor drive.

3. A system according to claim 2, wherein the motor drive is a stand-alone motor drive not connected to an industrial automation control network.

4. A system according to claim 1, wherein the industrial automation device comprises an automation controller.

5. A system according to claim 1, wherein the first security interface is configured to compare the information from the access device with stored information associated with the user.

6. A system according to claim 5, wherein the information received from the access device is a first unique code, and wherein the stored information comprises a second unique code associated with the access device and with the user.

7. A system according to claim 6, wherein the security interface compares the first unique code with the second unique code to determine whether a match exists.

8. A system according to claim 6, wherein the access device is a handheld card.

9. A system according to claim 6, wherein the access device is a key fob.

10. A system according to claim 6, wherein the second unique code is one of a plurality of codes stored in a database and associated with a plurality of different users, and wherein the database further stores access rights information for the plurality of different users.

11. A system according to claim 5, wherein the information received from the access device is biometric information, and wherein the stored information comprises biometric information associated with the user.

12. A system according to claim 11, wherein the first security interface compares the biometric information received from the access device with the stored biometric information associated with the user to determine whether a match exists.

13. A system according to claim 11, wherein the access device is a fingerprint reader.

14. A system according to claim 11, wherein the access device is a retinal scanner.

15. A system according to claim 11, wherein the biometric information is stored in a database along with other biometric information associated with a plurality of different users, and wherein the database further stores access rights information for the plurality of different users.

16. A system according to claim 1,
wherein first security interface receives the information from the access device indirectly by way of the first security interface,
wherein the first security interface uses the information identifying the user to determine access rights of the user, and
wherein the first security interface permits access to the data stored inside the industrial automation device based on a determination that the access rights of the user permit access to the data.

17. A system according to claim 16,
wherein the industrial automation device is a first industrial automation device,
wherein the system further comprises a third security interface and a second industrial automation device, and
wherein the communication network is coupled between (i) the combination of the first industrial automation device and the first security interface, (ii) the combination of the user interface and the second security interface, and (iii) the combination of the second industrial automation device and the third security interface.

18. A system according to claim 17, wherein the third security interface cooperates with the first security interface to provide the second automation device with access to the data stored inside the first industrial automation device.

19. A system according to claim 18,
wherein the third security interface transmits information identifying the second automation device to the first security interface,
wherein the first security interface uses the information identifying the second automation device to determine access rights of the second automation device, and
wherein the first security interface permits access to the data stored inside the first industrial automation device based on a determination that the access rights of the second automation device permit access to the data.

20. A system according to claim 1, further comprising an information server configured to standardize communication from different ones of the plurality of additional automation devices, manufacturing execution systems, and external business computing systems.

21. A system according to claim 20, wherein the information server comprises a directory module configured to provide a common address book for parameters associated with different ones of the plurality of automation devices.

22. A system according to claim 21, wherein the information server further comprises a real-time data module configured to provide access to real-time information from the plurality of industrial automation devices.

23. A system according to claim 22, wherein the information server further comprises a data model module configured to provide a common terminology to describe manufacturing operations.

24. A system according to claim 22, wherein the information server further comprises a portal module configured to provide access to information stored in the plurality of industrial automation devices to workstations remotely connected to the industrial automation system by way of the Internet.

25. A system according to claim 22, wherein the information server further comprises an audit module configured to maintain a comprehensive list of changes made to the plurality of industrial automation devices.

26. A system according to claim 1, wherein the user interface comprises a viewer tool configured to display trending, alarming, and other runtime information pertaining to the industrial automation device and the plurality of additional automation devices.

27. A system according to claim 1, wherein the user interface comprises a viewer tool configured to provide real time animation of the equipment controlled by the industrial automation device and the plurality of additional automation devices.

28. A system according to claim 1, wherein the user interface comprises an analysis tool configured to provide information regarding the performance of the industrial automation system, the analysis tool including tools configured to provide information regarding causes of downtime, efficiency of equipment, scrap/defect rates, and drifting parameters.

29. A system according to claim 1, wherein the user interface comprises a historian tool configured to analyze historical information regarding past performance of the industrial automation system to provide information regarding process variability.

30. A system according to claim 1, wherein the user interface comprises a scheduler tool configured to provide information useable to develop a schedule to track labor, material, and equipment resources.

31. A system according to claim 30, wherein the scheduler tool is configured to provide scheduling information as a function of shift patterns, labor/tooling/material availability, planned maintenance, current loading, and capacities.

32. A system according to claim 30, wherein the scheduler tool is configured to provide information regarding production sequences, information regarding the effects of schedule changes, and information regarding delivery dates.

33. A system according to claim 1, wherein the user interface comprises a configuration tool useable to centrally manage configuration of the industrial automation device and the plurality of additional industrial automation devices.

34. A system according to claim 1, wherein the user interface comprises a diagnostics tool configured to display diagnostic messages generated by the industrial automation device and the plurality of additional industrial automation devices.

35. A system according to claim 1, wherein the user interface comprises a reporting/audit trail tool configured to generate detailed reports showing an audit trail of changes to one or more of the industrial automation device and the plurality of additional industrial automation devices the automation system.

36. A system according to claim 1, wherein the user interface comprises a messenger tool configured to provide alarm annunciation, paging, and messaging based on the information accessed from the industrial automation device and the plurality of additional industrial automation devices.

37. A system according to claim 1, wherein the user interface comprises an inventory management tool configured to provide information concerning consumption of raw materials and other resources in the industrial automation system.

38. A system according to claim 1, wherein the user interface is connected to the industrial automation device by way of the Internet.

39. A system according to claim 1, wherein the user interface is configured to display a login screen to the user to obtain a user password.

40. A system according to claim 1, wherein the security interface is integrally provided with the user interface.

41. A system according to claim 1, wherein the security interface is integrally provided with the industrial automation device.

42. An industrial automation system comprising:
a user interface;
a security access device;
a plurality of security interfaces;
a communication network;
a plurality of motor drives coupled to each other by way of the communication network, each respective motor drive having associated therewith a respective one of the plurality of security interfaces, the respective security interface being configured to receive information from the access device and, based on the information received from the access device, to provide authorization for the user to access the data stored inside the respective motor drive using the user interface;
a plurality of automation controllers coupled to each other and to the plurality of motor drives by way of the communication network, each respective automation controller having associated therewith a respective one of the plurality of security interfaces, the respective security interface being configured to receive information from the access device and, based on the information received from the access device, to provide authorization for the user to access the data stored inside the respective automation controller using the user interface;
wherein at least one of the plurality of automation controllers is configured to transmit messages to other ones of the plurality of automation controllers that may have also received the information from the security access device, the message alerting the plurality of automation controllers that access is in the process of being granted or has been granted to at least one of the plurality of automation controllers.

43. A system according to claim 42, wherein the communication network comprises a plurality of sub-networks including a control communication network and an enterprise information communication network, wherein the user interface is a first workstation, wherein the system further comprises a plurality of additional workstations coupled to the enterprise information communication network, and wherein the plurality of automation controllers and the plurality of motor drives are connected to the control communication network.

44. A system according to claim 43, wherein the system further comprises an information server coupled to the control communication network and to the enterprise information communication network.

45. A system according to claim 42, wherein the user interface is associated with one of the plurality of security interfaces, and wherein the security interface associated with the user interface cooperates with the security interfaces associated with the plurality of motor drives and the security interfaces respectively associated with the plurality of automation controllers to provide the user with access to the data stored inside the plurality of motor drives and the plurality of automation controllers.

46. A system according to claim 42, wherein the access device is a hand-held device having a wireless transmitter.

47. A system according to claim 42, wherein the access device is configured to receive biometric information from the user.

48. A method of providing a user with access to data stored in an industrial automation device, comprising:
receiving a wireless signal from a hand-held security access device in the possession of the user;
processing the wireless signal to determine a password associated with the hand-held security access device;
presenting the user with a password prompt on a login screen using a user interface associated with the industrial automation device;
receiving a password from the user via the password prompt;
comparing the password received from the user with the password associated with the hand-held security access device to confirm that the user has entered the correct password;
identifying the user based on the wireless signal from the hand-held security access device and/or based on information received from the user via the user interface;
determining access rights of the user based on the identity of the user; and
providing access to the data stored in the industrial automation device in accordance with the access rights of the user;
wherein the industrial automation device is a first industrial automation device, and wherein the method further comprises transmitting a message from the industrial automation device to other industrial automation devices that may have also received the wireless signal from the hand-held security access device, the message alerting the other industrial automation devices that access is in the process of being granted or has been granted at the first industrial automation device.

49. A method according to claim 48, wherein processing the wireless signal to determine the password comprises retrieving the password from a database based on information contained in the wireless signal.

50. A method according to claim 48, wherein the user is presented with the login screen responsive to reception of the wireless signal from the hand-held security access device.

51. A method according to claim 48, further comprising preventing access at the other industrial automation devices responsive to the message transmitted from the first industrial automation device.

52. An industrial automation system comprising:
a communication network;
a security access device;
a security interface configured to receive information from the security access device and to compare the information from the security access device with stored information associated with a user;
a user interface coupled to the security interface and to the communication network;
a plurality of motor drives coupled to each other by way of the communication network;
a plurality of automation controllers coupled to each other and to the plurality of motor drives by way of the communication network;
a security module configured to provide the user with access via the user interface to data stored in the plurality of motor drives and to data stored in the plurality of automation controllers based on an authentication of the user using the security access device; and
an information server configured to standardize communication from different ones of a plurality of additional automation devices, manufacturing execution systems, and external business computing systems.

53. A system according to claim 52, wherein the information received from the access device is a first unique code, and wherein the stored information comprises a second unique code associated with the access device and with the user.

54. A system according to claim 53, wherein the security interface compares the first unique code with the second unique code to determine whether a match exists.

55. A system according to claim 53, wherein the access device is a handheld card.

56. A system according to claim 53, wherein the access device is a key fob.

57. A system according to claim 53, wherein the second unique code is one of a plurality of codes stored in a database and associated with a plurality of different users, and wherein the database further stores access rights information for the plurality of different users.

58. A system according to claim 52, wherein the information received from the access device is biometric information, and wherein the stored information comprises biometric information associated with the user.

59. A system according to claim 58, wherein the security interface compares the biometric information received from the access device with the stored biometric information associated with the user to determine whether a match exists.

60. A system according to claim 58, wherein the access device is a fingerprint reader.

61. A system according to claim 58, wherein the access device is a retinal scanner.

62. A system according to claim 58, wherein the biometric information is stored in a database along with other biometric information associated with a plurality of different users, and wherein the database further stores access rights information for the plurality of different users.

63. A system according to claim 52, wherein the information server comprises a directory module configured to provide a common address book for parameters associated with different ones of the plurality of additional automation devices.

64. A system according to claim 52, wherein the information server further comprises a real-time data module configured to provide access to real-time information from the plurality of additional industrial automation devices.

65. A system according to claim 52, wherein the information server further comprises a data model module configured to provide a common terminology to describe manufacturing operations.

66. A system according to claim 52, wherein the information server further comprises a portal module configured to provide access to information stored in the plurality of industrial automation devices to workstations remotely connected to the industrial automation system by way of the Internet.

67. A system according to claim 52, wherein the information server further comprises an audit module configured to maintain a comprehensive list of changes made to the plurality of additional industrial automation devices.

68. A system according to claim 52, wherein the user interface comprises a viewer tool configured to display trending, alarming, or a combination thereof, pertaining to the plurality of automation controllers and the plurality of motor drives.

69. A system according to claim 52, wherein the user interface comprises a viewer tool configured to provide real time animation of the equipment controlled by an industrial automation device and the plurality of additional automation devices.

70. A system according to claim 52, wherein the user interface comprises an analysis tool configured to provide information regarding the performance of the industrial automation system, the analysis tool including tools configured to provide information regarding causes of downtime, efficiency of equipment, scrap/defect rates, and drifting parameters.

71. A system according to claim 52, wherein the user interface comprises a historian tool configured to analyze historical information regarding past performance of the industrial automation system to provide information regarding process variability.

72. A system according to claim 52, wherein the user interface comprises a scheduler tool configured to provide information useable to develop a schedule to track labor, material, and equipment resources.

73. A system according to claim 72, wherein the scheduler tool is configured to provide scheduling information as a function of shift patterns, labor/tooling/material availability, planned maintenance, current loading, and capacities.

74. A system according to claim 72, wherein the scheduler tool is configured to provide information regarding production sequences, information regarding the effects of schedule changes, and information regarding delivery dates.

75. A system according to claim 52, wherein the user interface comprises a configuration tool useable to centrally manage configuration of the industrial automation device and the plurality of additional industrial automation devices.

76. A system according to claim 52, wherein the user interface comprises a diagnostics tool configured to display diagnostic messages generated by the industrial automation device and the plurality of additional industrial automation devices.

77. A system according to claim 52, wherein the user interface comprises a reporting/audit trail tool configured to generate detailed reports showing an audit trail of changes to one or more of the industrial automation device and the plurality of additional industrial automation devices the automation system.

78. A system according to claim 52, wherein the user interface comprises a messenger tool configured to provide alarm annunciation, paging, and messaging based on the information accessed from the industrial automation device and the plurality of additional industrial automation devices.

79. A system according to claim 52, wherein the user interface comprises an inventory management tool configured to provide information concerning consumption of raw materials and other resources in the industrial automation system.

80. A system according to claim 52, wherein the user interface is connected to the industrial automation device by way of the Internet.

81. A system according to claim 52, wherein the communication network comprises a plurality of separate sub-networks.

\* \* \* \* \*